United States Patent
Kobayashi

(10) Patent No.: US 9,836,120 B2
(45) Date of Patent: Dec. 5, 2017

(54) DISPLAY DEVICE, METHOD OF CONTROLLING THE SAME, AND COMPUTER PROGRAM

(71) Applicant: SEIKO EPSON CORPORATION, Tokyo (JP)

(72) Inventor: Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 78 days.

(21) Appl. No.: 14/830,165

(22) Filed: Aug. 19, 2015

(65) Prior Publication Data

US 2016/0062457 A1   Mar. 3, 2016

(30) Foreign Application Priority Data

Sep. 1, 2014 (JP) .................................. 2014-177097
May 12, 2015 (JP) .................................. 2015-097355

(51) Int. Cl.
| | | |
|---|---|---|
| *G06F 3/01* | (2006.01) | |
| *G06F 1/16* | (2006.01) | |
| *G06F 1/32* | (2006.01) | |
| *G06F 3/147* | (2006.01) | |

(52) U.S. Cl.
CPC ............ *G06F 3/013* (2013.01); *G06F 1/163* (2013.01); *G06F 1/1637* (2013.01); *G06F 1/3265* (2013.01); *G06F 3/147* (2013.01); *G09G 2330/022* (2013.01); *G09G 2340/0464* (2013.01)

(58) Field of Classification Search
None
See application file for complete search history.

(56) References Cited

U.S. PATENT DOCUMENTS

| 6,040,945 A * | 3/2000 | Karasawa .......... G02B 27/0172 |
| | | 348/E5.145 |
| 6,292,158 B1* | 9/2001 | Amafuji ............... G02B 27/017 |
| | | 345/672 |
| 6,943,754 B2* | 9/2005 | Aughey .................. A61B 3/113 |
| | | 345/7 |
| 2006/0017657 A1* | 1/2006 | Yamasaki ............ G02B 27/017 |
| | | 345/8 |
| 2006/0238878 A1* | 10/2006 | Miyake ................. H04N 5/7491 |
| | | 359/630 |
| 2007/0052672 A1* | 3/2007 | Ritter .................. G06F 3/03547 |
| | | 345/156 |
| 2008/0198324 A1* | 8/2008 | Fuziak ............... G02B 27/0172 |
| | | 351/158 |

(Continued)

FOREIGN PATENT DOCUMENTS

| JP | 2006-030802 A | 2/2006 |
| JP | 2007-243540 A | 9/2007 |
| JP | 2012-173664 A | 9/2012 |

*Primary Examiner* — Antonio Xavier
(74) *Attorney, Agent, or Firm* — Oliff PLC

(57) ABSTRACT

A display device includes a display unit which is able to take a first position which is a relative position with respect to user's eyes and a second position which is a relative position with respect to the eyes and is different from the first position. The display device further includes a display mode change unit which, when the display unit displaying an image at the first position is moved to the second position, changes the mode of the display continued on the display unit.

13 Claims, 14 Drawing Sheets

(56) References Cited

U.S. PATENT DOCUMENTS

| | | | | |
|---|---|---|---|---|
| 2009/0040233 A1* | 2/2009 | Yamamoto | ............ | G02B 27/017 345/592 |
| 2009/0243970 A1* | 10/2009 | Kato | .................. | G02B 27/0176 345/8 |
| 2010/0109975 A1* | 5/2010 | Larson | .................. | G02B 27/017 345/8 |
| 2011/0115703 A1* | 5/2011 | Iba | .......................... | G06F 3/013 345/156 |
| 2011/0194029 A1* | 8/2011 | Herrmann | ............ | G02B 27/017 348/569 |
| 2012/0306725 A1* | 12/2012 | Hilkes | ...................... | G09G 5/00 345/8 |
| 2013/0335543 A1* | 12/2013 | Hilkes | .................... | H04N 7/185 348/62 |
| 2014/0232747 A1* | 8/2014 | Sugimoto | ............... | G06F 3/011 345/633 |
| 2014/0375542 A1* | 12/2014 | Robbins | ............. | G02B 27/0176 345/156 |

\* cited by examiner

DISPLAY DEVICE, METHOD OF CONTROLLING THE SAME, AND COMPUTER PROGRAM

BACKGROUND

1. Technical Field

The present invention relates to a display device, a method of controlling the same, and a computer program.

2. Related Art

In the related art, various display devices which can display an image in front of user's eyes are suggested (JP-A-2012-173664, JP-A-2007-243540, and JP-A-2006-30802). In these display devices, a display unit is rotatably connected to a holder, when a user needs to look at an image, the display unit is positioned in front of user's eyes, and when the user does not need to look at an image, the display unit is moved to a position far away from the user's eyes. Therefore, the display devices with high convenience for the user are provided.

JP-A-2012-173664 describes a display device which turns on a display function of a display unit when it is detected that the display unit is positioned in front of the user's eyes by a proximity sensor and turns off the display function of the display unit when it is detected that the display unit is far away from the user's eyes by the proximity sensor. According to this display device, it is possible to avoid wasteful battery consumption.

However, in the display device of the related art, in order to try to avoid battery consumption, if the face of the user is not close to the display unit, display is not performed, and thus, the convenience as the display device tends to be sacrificed. Depending on the usage of the display device, there is a request to secure the convenience as the display device rather than to suppress power consumption in the display unit. In addition, in the display device of the related art, there is demand for improvement of security, power saving, compactness of the device configuration, reduction in cost, resource saving, facilitation of manufacturing, and the like.

SUMMARY

An advantage of some aspects of the invention is to solve at least a part of the problems described above, and the invention can be implemented as the following forms.

(1) An aspect of the invention is directed to a display device. The display device includes: a display unit which is able to take a first position which is a relative position with respect to user's eye and a second position which is a relative position with respect to the eyes and is different from the first position; and a display mode change unit which, when the display unit displaying an image at the first position is moved to the second position, changes the mode of the display continued on the display unit. According to the display device of this aspect, when the display unit is moved from the first position to the second position, the mode of the display continued on the display unit is changed. For this reason, even when the display unit is at the second position, the mode of the display of the image on the display unit is switched to an appropriate mode to continue the display. Accordingly, according to the display device of this aspect, it is possible to improve the convenience for the user.

(2) In the display device according to the aspect described above, the first position may be a position in front of the user's eyes, and second position may be a position different from the position in front of the eyes. According to the display device of this aspect, even if the display unit is not in front of the user's eyes, the mode of the display of the image on the display unit is switched to an appropriate mode to continue the display. For this reason, when the display unit is not in front of the eyes, the user turns the visual line toward the display unit, whereby the user can visually recognize the image through the display unit. Therefore, according to the display device of this aspect, it is possible to improve the convenience for the user.

(3) In the display device according to the aspect described above, the display unit may be provided so as to be rotatable with respect to a mounting base portion mountable on the head of the user. The display device may further include: a rotation position detection unit which detects a rotation position of the display unit from the first position. The display mode change unit may change the mode of the display based on the detected rotation position. According to the display device of this aspect, the display unit rotates with respect to the mounting base portion mounted on the head of the user, whereby the display unit can be moved from the first position, and the mode of the display of the image on the display unit can be changed based on the rotation position from the first position. For this reason, according to the display device of this aspect, the position of the display unit can be easily moved, and the mode of the display of the image is suitably changed according to the position of the display unit.

(4) In the display device according to the aspect described above, the rotation position detection unit may be an angle detection unit which detects a rotation angle from the first position. According to the display device of this aspect, it is possible to find out how much the display unit is moved from the first position based on the rotation angle.

(5) The display device according to the aspect described above may further include a display stop unit which stops the display of the image on the display unit when the rotation position detected by the rotation position detection unit is a position at a distance equal to or greater than a predetermined threshold value from the first position. According to the display device of this aspect, when the position of the display unit is far away from the first position of the user and visual recognition is impossible, wasteful display is not performed on the display unit. As a result, it is possible to avoid wasteful power consumption and to prevent a display image from being peeped.

(6) In the display device according to the aspect described above, the display unit may be provided so as to be movable from the first position in a predetermined direction. The display device may further include: a movement position detection unit which detects a movement position of the display unit from the first position. The display mode change unit may change the mode of the display based on the detected movement position. According to the display device of this aspect, the display unit is moved in a predetermined direction with respect to the mounting base portion mounted on the head of the user, whereby it is possible to move the display unit from the first position and to change the mode of the display of the image on the display unit based on the movement position from the first position. For this reason, according to the display device of this aspect, the position of the display unit can be easily moved, and the mode of the display of the image is suitably changed according to the position of the display unit.

(7) In the display device according to the aspect described above, the predetermined direction may be at least one direction of an upward direction and a downward direction.

According to the display device of this aspect, it is possible to move the display unit in the upward direction and the downward direction.

(8) In the display device according to the aspect described above, the display unit may be provided on each of the left and right sides for both eyes of the user, the predetermined direction may be at least one direction of a left direction and a right direction, and the display mode change unit may allow only the right display unit to perform display when the display unit is moved to the right side, and allow only the left display unit to perform display when the display unit is moved to the left side. According to the display device of this aspect, it is possible to move the display unit in the right direction and the left direction, and to look at an optical image display unit on a side on which the display is performed at a sidelong glance.

(9) In the display device according to the aspect described above, the display mode change unit may change the position and size of a display area as the mode of the display to be changed. According to the display device of this aspect, the position and size of the display area are changed, whereby it is possible to suitably change the mode of the display of the image according to the position of the display unit.

(10) In the display device according to the aspect described above, the display unit may have a configuration of being able to be moved in an upward direction from the first position, and the display mode change unit may change the display area to a lower side of the display unit as the change of the position. According to the display device of this aspect, when the display unit is moved in the upward direction from the first position, the position of the display area is changed to the lower side of the display unit. For this reason, the user turns the visual line upward, whereby the user can easily visually recognize the display area. Therefore, it is possible to further improve the convenience for the user.

(11) In the display device according to the aspect described above, the display mode change unit may change brightness of the display of the image as the mode of the display to be changed. According to the display device of this aspect, brightness of the display of the image is changed, whereby it is possible to suitably change the mode of the display of the image.

(12) In the display device according to the aspect described above, the display mode change unit may return the mode of the display to the mode displayed at the first position when the display unit is returned from the second position to the first position. According to the display device of this aspect, it is possible to allow easy return to the original mode of the display only by returning the display unit to the first position. Therefore, it is possible to further improve the convenience for the user.

(13) In the display device according to the aspect described above, the display unit may display the image to allow the user mounted with the display device to visually recognize the image and is able to transmit an outside scene. According to the display device of this aspect, in a so-called transmissive display device, when the display unit is moved from the eyes, it is possible to improve the convenience for the user.

Not all of the plurality of components of the foregoing aspects of the invention are inevitable, and in order to solve part of or all of the foregoing problems or in order to achieve part of or all of the effects disclosed in the specification, part of the plurality of components can be appropriately changed, deleted or substituted by another new component, or part of the limited contents can be deleted. Besides, in order to solve part of or all of the foregoing problems or in order to achieve part of or all of the effects disclosed in the specification, part of or all of the technical features included in one aspect of the invention can be combined with part of or all of the technical features included in another aspect of the invention to obtain one independent from of the invention.

For example, one aspect of the invention can be implemented as a device including one or more or all of the two components, that is, the display unit and the display mode change unit. That is, this device may include the display unit or may not include the display unit. Besides, this device may include the display mode change unit or may not include the display mode change unit. The display unit may be construed as, for example, a display unit which is able to take a first position which is a relative position with respect to the user's eyes and a second position which is a relative position with respect to the eyes and is different from the first position. The display mode change unit may be construed as, for example, a display mode change unit which, when the display unit displaying an image at the first position is moved to the second position, changes a mode of the display continued on the display unit. Although such a device can be implemented as the display device, it can be implemented as another device other than the display device. According to the forms described above, at least one of various problems, such as improvement of the convenience for the user, improvement of security, power saving, compactness of the device configuration, reduction in cost, resource saving, and facilitation of manufacturing can be solved. Part of or all of the technical features of the respective forms of the foregoing display device can be applied to this device.

The invention can be implemented in various forms in addition to a display device. For example, the invention can be implemented in the form of a method of controlling a display device, a display system, a head mounted display device, a method of controlling a head mounted display device, a head mounted display system, a computer program for implementing the functions of the display device, a recording medium having the computer program recorded thereon, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
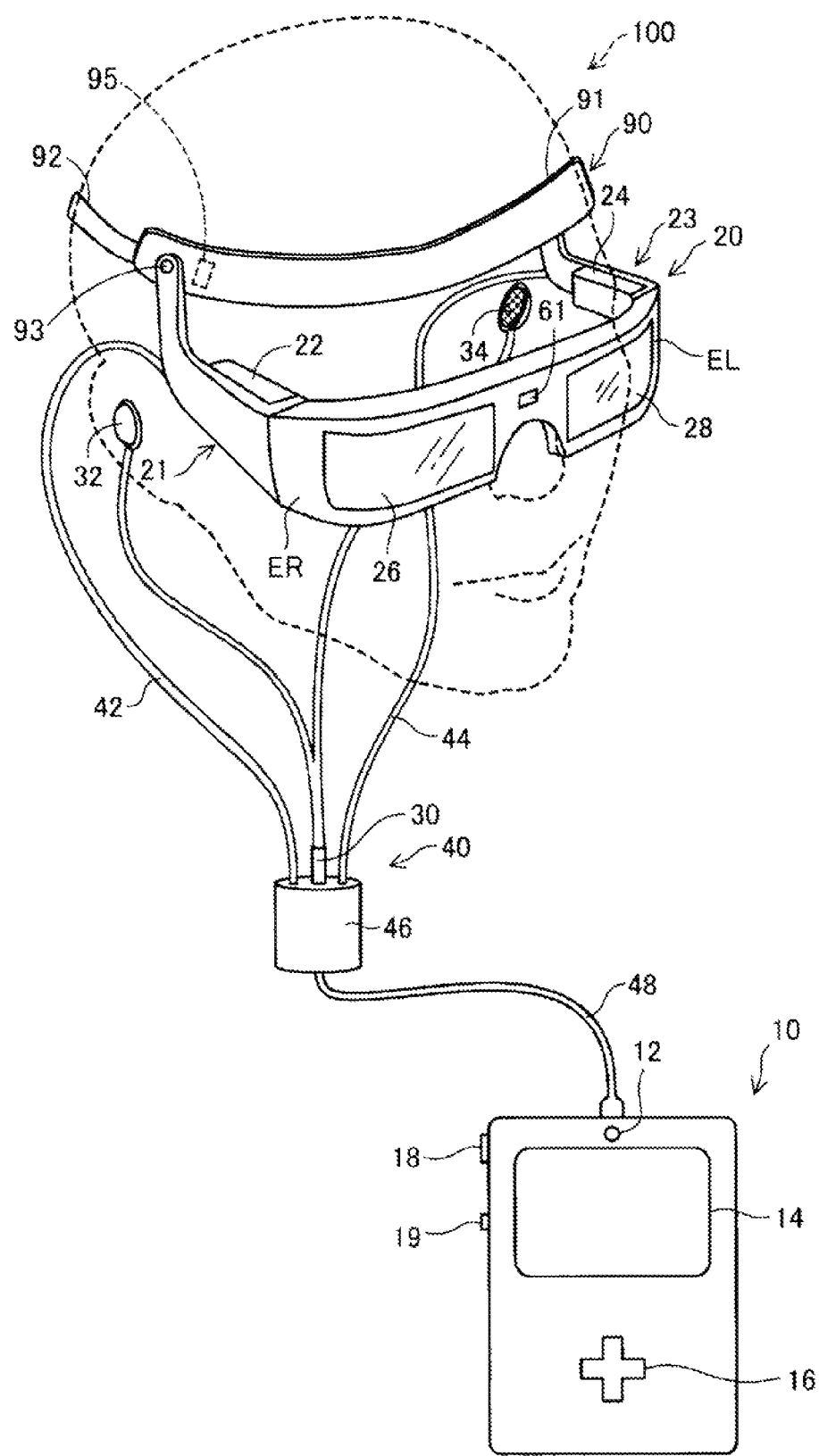
FIG. 1 is an explanatory view showing the schematic configuration of a head mounted display device according to a first embodiment of the invention.

A. First Embodiment:
A-1. Configuration of Head-Mounted Display Device:

FIG. 1 is an explanatory view showing the schematic configuration of a head mounted display device according to a first embodiment of the invention. A head mounted display device 100 is a display device which is mounted on a head, and is called a head mounted display (HMD). The HMD 100 is an optical transmissive head mounted display in which a user can visually recognize a virtual image and can directly and visually recognize an outside scene.

The HMD 100 includes a mounting belt 90 which is mountable on the head of the user, an image display unit 20 which allows the user to visually recognize a virtual image in a state mounted on the head of the user, that is, displays an image, and a control unit (controller) 10 which controls the image display unit 20.

The mounting belt 90 includes a resin mounting base portion 91, and a cloth belt portion 92 which is connected to the mounting base portion 91. The mounting base portion 91 has a curved shape along a forehead of a person, and is mounted around the head of the user by the belt portion 92.

The image display unit 20 is a display unit which is connected to the mounting base portion 91 of the mounting belt 90, and in this embodiment, has an eyeglass shape. The image display unit 20 includes a right holding unit 21, a right display drive unit 22, a left holding unit 23, a left display drive unit 24, a right optical image display unit 26, and a left optical image display unit 28. The right optical image display unit 26 and the left optical image display unit 28 are respectively positioned in front of the right and left eyes of the user when the user mounts the image display unit 20. One end of the right optical image display unit 26 and one end of the left optical image display unit 28 are connected to each other at a position corresponding to the brow of the user when the user mounts the image display unit 20.

The right holding unit 21 has a shape which extends in a substantially horizontal direction from an end portion ER which is the other end of the right optical image display unit 26 and is inclined obliquely upward halfway, and connects the end portion ER and a right connection portion 93 of the mounting base portion 91. Similarly, the left holding unit 23 has a shape which extends in a substantially horizontal direction from an end portion which is the other end of the left optical image display unit 28 and is inclined obliquely upward halfway, and connects the end portion EL and a left connection portion (not shown) of the mounting base portion 91. The right holding unit 21 and the left holding unit 23 are connected to the mounting base portion 91 by the right and left connection portions 93, whereby the right optical image display unit 26 and the left optical image display unit 28 are positioned in front of the user's eyes. The respective connection portions 93 connect the right holding unit 21 and the left holding unit 23 so as to be rotatable and fixable at an arbitrary rotation position. A detailed configuration of the connection portions 93 is a known configuration, and thus, detailed description thereof will be omitted. As a result, the image display unit 20 is provided so as to be rotatable with respect to the mounting base portion 91. A state of rotation will be described later in detail.

The right display drive unit 22 is disposed inside the right holding unit 21, in other words, on the head side of the user when the user mounts the image display unit 20. The left display drive unit 24 is disposed inside the left holding unit 23. Hereinafter, the right holding unit 21 and the left holding unit 23 will be described as "holding units" with no distinction therebetween. Similarly, the right display drive unit 22 and the left display drive unit 24 will be described as "display drive units" with no distinction therebetween, and the right optical image display unit 26 and the left optical image display unit 28 will be described as "optical image display units" with no distinction therebetween.

The display drive units respectively include liquid crystal displays (hereinafter, referred to as "LCD") 241 and 242, projection optical systems 251 and 252, and the like (see FIG. 2). Details of the configuration of the display drive units will be described below. The optical image display units as optical members respectively include light guide plates 261 and 262 (see FIG. 2) and dimmer plates. The light guide plates 261 and 262 are formed of a transmissive resin material or the like, and guide image light output from the display drive units to the user's eyes. The dimmer plates are thin plate-shaped optical elements and are disposed so as to cover the front side of the image display unit 20 (the side opposite to the user's eyes side). The dimmer plates respectively protect the light guide plates 261 and 262 and suppress damage, stain adhesion, or the like to the light guide plates 261 and 262. It is possible to adjust the amount of external light entering the user's eyes to adjust ease of visual recognition of a virtual image by adjusting the transmittance of the dimmer plates. The dimmer plates can be omitted.

The image display unit 20 further has a connection unit 40 which connects the image display unit 20 to the control unit 10. The connection unit 40 includes a body cord 48 which is connected to the control unit 10, a right cord 42 and a left cord 44 which are two parts branched from a body cord 48, and a connection member 46 which is provided at a branch point. The connection member 46 is provided with a jack for connection to an earphone plug 30. A right earphone 32 and a left earphone 34 extend from the earphone plug 30.

The image display unit 20 and the control unit 10 perform transmission of various signals through the connection unit 40. An end portion of the body cord 48 opposite to the connection member 46 and the control unit 10 are respectively provided with connectors (not shown) which are fitted to each other, the control unit 10 and the image display unit 20 are connected or disconnected by fitting and fitting release of the connector of the body cord 48 and the connector of the control unit 10. For the right cord 42, the left cord 44, and the body cord 48, for example, a metal cable or an optical fiber can be used.

The control unit 10 is a device which controls the HMD 100. The control unit 10 includes a lighting unit 12, a touch pad 14, a cross key 16, and a power switch 18. The lighting unit 12 notifies the operation state (for example, power on/off or the like) of the HMD 100 by a light emission mode. As the lighting unit 12, for example, a light emitting diode (LED) can be used. The touch pad 14 detects a touch operation on the operation surface of the touch pad 14 and outputs a signal according to the detection content. As the touch pad 14, various touch pads, such as an electrostatic type, a pressure detection type, and an optical type, can be utilized. The cross key 16 detects a press operation to keys corresponding to the directions of up, down, right, and left and outputs a signal according to the detection content. The power switch 18 detects a slide operation of the switch to switch the state of the power supply of the HMD 100.

Figure 2:
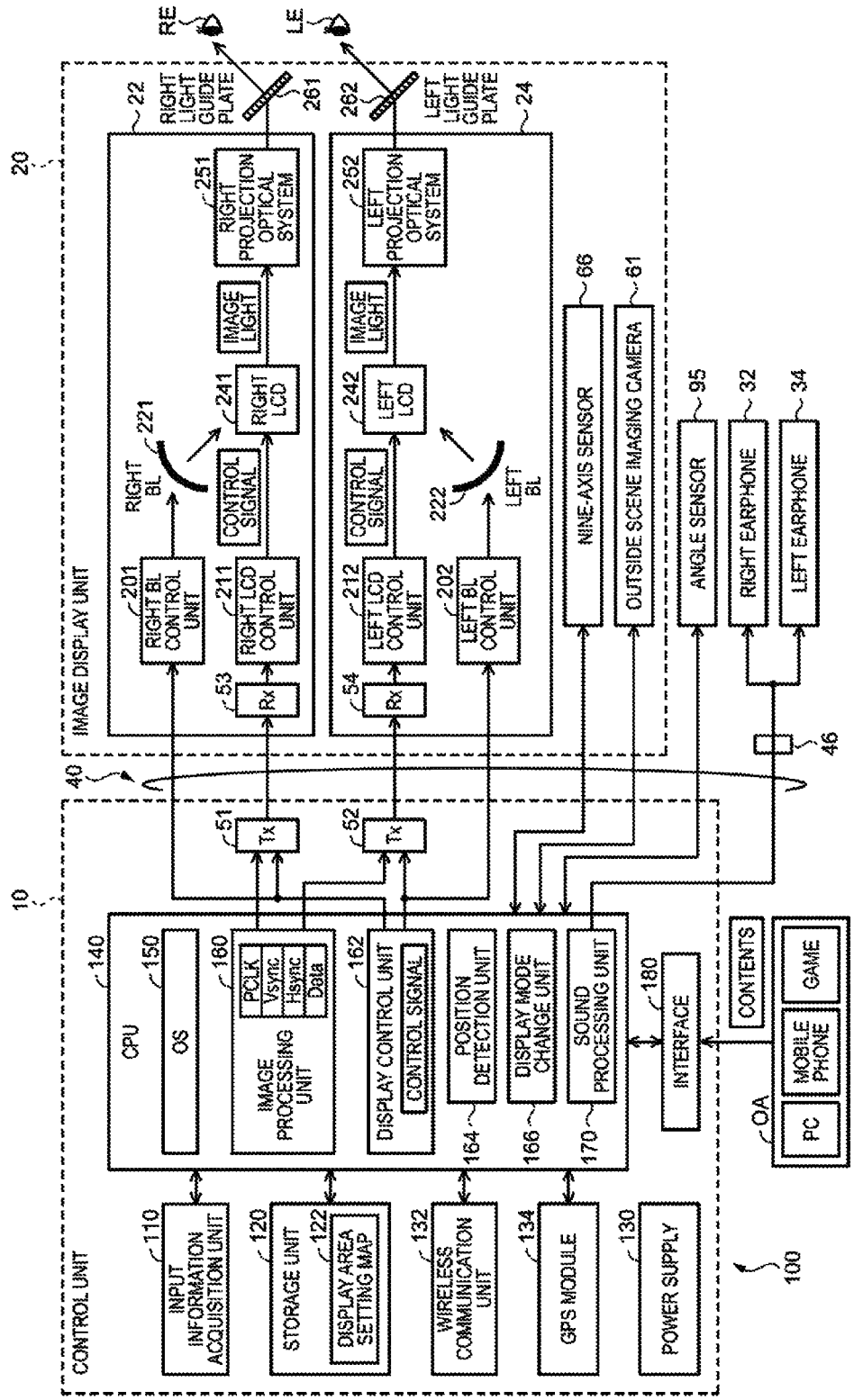
FIG. 2 is a block diagram functionally showing the configuration of the head mounted display device.

FIG. 2 is a block diagram functionally shoring the configuration of the HMD 100. The control unit 10 includes an input information acquisition unit 110, a storage unit 120, a power supply 130, a wireless communication unit 132, a GPS module 134, a CPU 140, an interface 180, and transmission units (Tx) 51 and 52. The respective units are connected to one another by a bus (not shown).

The input information acquisition unit 110 acquires, for example, a signal according to an operation input to the touch pad 14, the cross key 16, the power switch 18, or the like. The storage unit 120 is constituted by a ROM, a RAM, a DRAM, a hard disk, or the like. The storage unit 120 stores a display area setting map 122. The display area setting map 122 is data in a map format for use in display area change processing. Details of the display area setting map 122 and the display area change processing will be described below.

The power supply 130 supplies power to the respective units of the HMD 100. As the power supply 130, for example, a secondary battery, such as a lithium polymer battery or a lithium-ion battery, can be used. A primary battery or a fuel battery may be used instead of the secondary battery, or an operation may be performed upon receiving wireless power supply. Besides, power supply may be received from a solar battery and a capacitor. The wireless communication unit 132 performs wireless communication with other apparatuses based on a predetermined wireless communication standard, such as wireless LAN, Bluetooth (Registered Trademark), or iBeacon (Registered Trademark). The GPS module 134 receives signals from GPS satellites, thereby detecting the current position thereof.

The CPU 140 reads and executes a computer program stored in the storage unit 120, thereby functioning as an operating system (OS) 150, an image processing unit 160, a display control unit 162, a position detection unit 164, a display mode change unit 166, and a sound processing unit 170.

The image processing unit 160 generates signals based on content (video) input through the interface 180 or the wireless communication unit 132. The image processing unit 160 supplies the generated signals to the image display unit 20 through the connection unit 40 to control the image display unit 20. The signals which are supplied to the image display unit 20 are different between an analog format and a digital format. In the case of an analog format, the image processing unit 160 generates and transmits a clock signal PCLK, a vertical synchronization signal VSync, a horizontal synchronization signal HSync, and image data Data. Specifically, the image processing unit 160 acquires an image signal included in content. For example, in the case of a moving image, the acquired image signal is generally an analog signal which is constituted of 30 frame images per second. The image processing unit 160 separates synchronization signals, such as the vertical synchronization signal VSync and the horizontal synchronization signal HSync, from the acquired image signal and generates the clock signal PCLK according to the periods of the synchronization signals by a PLL circuit or the like. The image processing unit 160 converts the analog image signal with the synchronization signals separated to a digital image signal using an A/D conversion circuit or the like. The image processing unit 160 stores the digital image signal after conversion in the DRAM of the storage unit 120 for each frame as image data Data of RGB data.

In the case of a digital format, the image processing unit 160 generates and transmits a clock signal PCLK and image data Data. Specifically, when content is in a digital format, the clock signal PCLK is output in synchronization with an image signal, and thus, the generation of the vertical synchronization signal VSync and the horizontal synchronization signal HSync and the A/D conversion of the analog image signal are not required. The image processing unit 160 may execute image processing, such as resolution conversion processing, various kinds of color tone processing including luminance and chroma adjustment, and keystone correction processing, on image data Data stored in the storage unit 120.

The image processing unit 160 transmits the generated clock signal PCLK, vertical synchronization signal VSync, horizontal synchronization signal HSync, and image data Data stored in the DRAM of the storage unit 120 through the transmission units 51 and 52. Image data Data which is transmitted through the transmission unit 51 is referred to as "right-eye image data Data1", and image data Data which is transmitted through the transmission unit 52 is referred to as "left-eye image data Data2". The transmission units 51 and 52 function as a transceiver for serial transmission between the control unit 10 and the image display unit 20.

The display control unit 162 generates control signals for controlling the right display drive unit 22 and the left display drive unit 24. Specifically, the display control unit 162 individually controls drive ON/OFF of a right LCD 241 by a right LCD control unit 211, drive ON/OFF of a right backlight 221 by a right backlight control unit 201, drive ON/OFF of a left LCD 242 by a left LCD control unit 212, and drive ON/OFF of a left backlight 222 by a left backlight control unit 202 by the control signals, thereby controlling the generation and emission of image light by the right display drive unit 22 and the left display drive unit 24. The display control unit 162 transmits the control signals for the right LCD control unit 211 and the left LCD control unit 212 through the transmission units 51 and 52. Similarly, the display control unit 162 transmits the control signals for the right backlight control unit 201 and the left backlight control unit 202.

The position detection unit 164 detects the position (in this embodiment, a rotated position) of the image display unit 20. The display mode change unit 166 changes a mode of display of a virtual image (image) on the image display unit 20 based on the position detected by the position detection unit 164. Details of the position detection unit 164 and the display mode change unit 166 will be described below.

The sound processing unit 170 acquires a sound signal included in content, amplifies the acquired sound signal, and supplies the amplified sound signal to a speaker (not shown) in the right earphone 32 and a speaker (not shown) in the left earphone 34 connected to the connection member 46. For example, when the Dolby (Registered Trademark) system is utilized, the processing on the sound signal is performed, and different sounds with a frequency or the like changed are output from the right earphone 32 and the left earphone 34.

The interface 180 is an interface for connecting various external apparatuses OA as a content supply source to the control unit 10. Examples of the external apparatus OA include a personal computer PC, a mobile phone terminal, a game terminal, and the like. As the interface 180, for example, a USB interface, a micro USB interface, an interface for a memory card, or the like can be used.

The image display unit 20 includes the right display drive unit 22, the left display drive unit 24, a right light guide plate 261 as the right optical image display unit 26, a left light guide plate 262 as the left optical image display unit 28, an outside scene imaging camera 61 (also see FIG. 1), and a nine-axis sensor 66.

The outside scene imaging camera 61 is disposed at a position corresponding to the brow of the user when the user mounts the image display unit 20. For this reason, the outside scene imaging camera 61 images an outside scene which is a scene outside in a direction the user faces in a state where the user mounts the image display unit 20 on the head. The outside scene imaging camera 61 is a monocular camera, but may be a stereo camera.

The nine-axis sensor 66 is a motion sensor which detects acceleration (three-axis), angular velocity (three-axis), and terrestrial magnetism (three-axis). Since the nine-axis sensor 66 is provided in the image display unit 20, when the image display unit 20 is mounted on the head of the user, the nine-axis sensor 66 detects motion of the head of the user. The direction of the image display unit 20 is specified from the detected motion of the head of the user.

The right display drive unit 22 includes a reception unit (Rx) 53, the right backlight (BL) control unit 201 and the right backlight (BL) 221 functioning as a light source, the right LCD control unit 211 and the right LCD 241 functioning as a display element, and a right projection optical system 251. The right backlight control unit 201, the right LCD control unit 211, the right backlight 221, and the right LCD 241 are collectively referred to as an "image light generation unit".

The reception unit 53 functions as a receiver for serial transmission between the control unit 10 and the image display unit 20. The right backlight control unit 201 drives the right backlight 221 based on the input control signal. The right backlight 221 is, for example, a luminous body, such as an LED or an electroluminescence (EL). The right LCD control unit 211 drives the right LCD 241 based on the clock signal PCLK, the vertical synchronization signal VSync, the horizontal synchronization signal HSync, and right-eye image data Data1 input through the reception unit 53. The right LCD 241 is a transmissive liquid crystal panel with a plurality of pixels arranged in a matrix. The right LCD 241 drives liquid crystal at each pixel position arranged in a matrix to change transmittance of light transmitting through the right LCD 241, thereby modulating illumination light irradiated from the right backlight 221 to effective image light representing an image.

The right projection optical system 251 is constituted by a collimator lens which collimates image light emitted from the right LCD 241 to a light beam in a parallel state. The right light guide plate 261 as the right optical image display unit 26 guides image light output from the right projection optical system 251 to a right eye RE of the user while reflecting along a predetermined optical path. The optical image display unit can use an arbitrary system as long as a virtual image is formed in front of the user's eyes using image light, and for example, may use a diffraction grating, or may use a transflective film. When the HMD 100 emits image light, in this specification, this is referred to that "an image is displayed". The optical image display unit corresponds to a "display unit" in an aspect of the invention described in "SUMMARY".

The left display drive unit 24 has the same configuration as the right display drive unit 22. That is, the left display drive unit 24 includes a reception unit (Rx) 54, the left backlight (BL) control unit 202 and the left backlight (BL) 222 functioning as a light source, the left LCD control unit 212 and the left LCD 242 functioning as a display element, and a left projection optical system 252. Similarly to the right LCD 241, the left LCD 242 drives liquid crystal at each pixel position arranged in a matrix to change transmittance of light transmitting through the left LCD 242, thereby modulating illumination light irradiated from the left backlight 222 to effective image light representing an image. In this embodiment, although a backlight system is utilized, image light may be emitted using a frontlight system or a reflection system.

Figure 3:
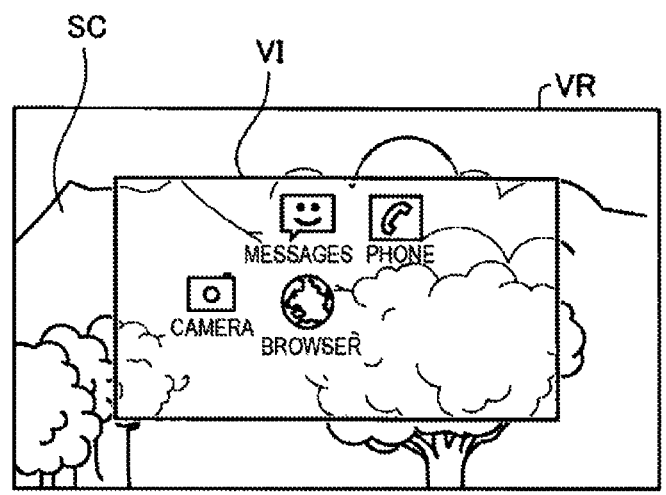
FIG. 3 is an explanatory view showing an example of a virtual image which is visually recognized by a user.

FIG. 3 is an explanatory view showing an example of a virtual image which is visually recognized by the user. In FIG. 3, a visual field VR of the user is illustrated. As described above, image light guided to both eyes of the user of the HMD 100 is formed on the retina of the user, whereby the user visually recognizes a virtual image (image) VI. In the example of FIG. 3, the virtual image VI corresponds to a display area described below, and is a menu screen of the OS of the HMD 100. The menu screen includes, for example, icons for activating application programs of "MESSAGES", "PHONE", "CAMERA", AND "BROWSER". The user visually recognizes an outside scene through the right optical image display unit 26 and the left optical image display unit 28. In this way, the user of the HMD of this embodiment can look at the virtual image VI and an outside scene SC behind the virtual image VI in a portion where the virtual image VI is displayed in the visual field VP. Besides, the user can directly look at the outside scene SC through the optical image display unit in a portion where the virtual image VI is not displayed in the visual field VR.

Figure 4:
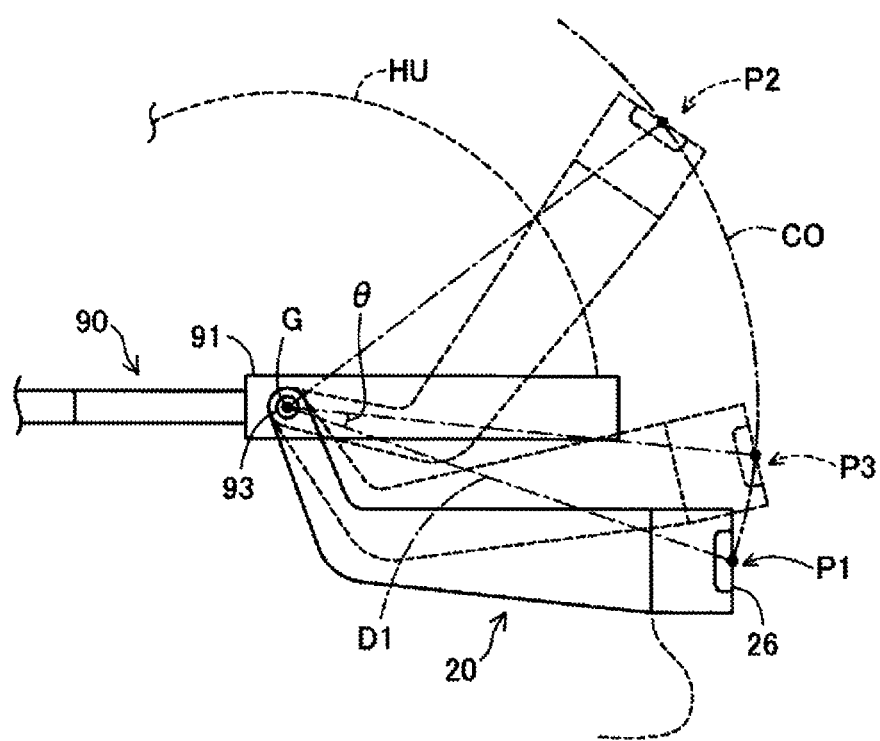
FIG. 4 is an explanatory view showing a state of rotation of an image display unit at the time of mounting of the head mounted display device.

A-2. Rotation of Image Display Unit:

FIG. 4 is an explanatory view showing a state of rotation of the image display unit 20 at the time of mounting of the HMD 100. FIG. 4 is a diagram when the mounting belt 90 and the image display unit 20 are viewed from the right side. The right and left optical image display units 26 and 28 in the image display unit 20 rotate on a circular orbit CO with the connection portion 93 provided in the mounting base portion 91 of the mounting belt 90 as a center G. In FIG. 4, only the right optical image display unit 26 is shown, and only the right side will be representatively described. The left side is the same as the right side. In detail, the optical image display unit 26 is movable to an arbitrary position (rotation position) from a first position P1 to a second position P2 on the circular orbit CO. The movement is performed manually by the user and is possible in a state in which the HMD 100 is mounted on the head. The first position P1 is a position where the optical image display unit 26 is disposed in front of the eyes of a user HU. In this embodiment, the first position P1 is a position where the optical image display unit 26 is disposed in front of the user's eyes in the horizontal direction, and at this time, the optical image display unit 26 is in a substantially vertical state in a state where the user HU is upright. The first position P1 is a position at the time of the normal use of the HMD 100. The second position P2 is position where the right and left optical image display units 26 and 28 are on the uppermost side, and is a direction determined by the structure of the connection portion 93.

The user HU can look at a display image as a virtual image displayed by the optical image display units 26 and 28 while visually recognizing the outside scene SC from the optical image display units 26 and 28 at the first position P1 where the optical image display units 26 and 28 are positioned in front of the right and left eyes. The user HU flips up the image display unit 20 from the first position P1, thereby moving the optical image display units 26 and 28 to an arbitrary position on the orbit CO to the second position P2. At a position (for example, a third position P3) in a range the second position P2 beyond the first position P1, the user HU can include the outside scene SC not transmitting through the optical image display unit and part of the optical image display units 26 and 28 in the visual field. That is, the visual line of the user is virtually divided into upper and lower regions, and the user can visually recognize the outside scene SC not transmitting through the optical image display unit in the lower divided region and an image as the virtual image VI displayed by the optical image display unit 26 in the upper divided region. At this time, the user can visually recognize part of the optical image display units 26 and 28 more clearly if turning the visual line upward. The first position P1 corresponds to a "first position" in an aspect of the invention described in "SUMMARY". Each position in a range to the second position P2 beyond the first position P1 is a position different from the position in front of the eyes of the user HU, and corresponds to a "second position" in an aspect of the invention described in "SUMMARY".

The rotation position of the optical image display units 26 and 28 on the circular orbit CO can be detected by an angle sensor 95. The angle sensor 95 is provided near the connection portion 93 in the mounting base portion 91, and when a direction D1 of the angle first position P1 is a reference direction, detects the angle (hereinafter, referred to as a "flip-up angle") $\theta$ between the direction of the rotation position of the optical image display units 26 and 28 and the reference direction. In this embodiment, the angle sensor 95 is a rotary type resistive potentiometer. The angle sensor 95 may be a sensor using a magnet, a rotary encoder, an optical sensor, or the like in place of the potentiometer.

Figure 5:
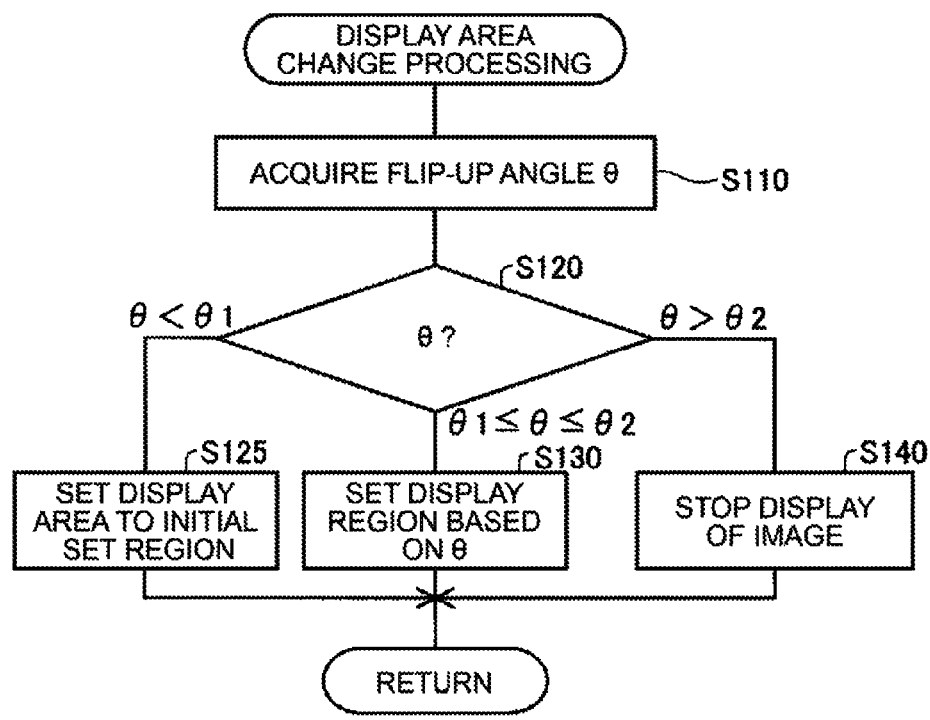
FIG. 5 is a flowchart showing a procedure of display area change processing.

A-3. Display Area Change Processing:

FIG. 5 is a flowchart showing a procedure of display area change processing. The display area change processing is executed by the CPU 140, and is processing for, when the optical image display units 26 and 28 are moved from the first position P1 to be a position in front of the eyes to another position, changing the position and size of the display area of the image as the virtual image by the image display unit 20. The position and size of the display area of the image are determined according to an instruction from the OS 150 or a specific application, and at the time of the normal use of the HMD 100 were the image display unit 20 is at the first position P1 (FIG. 4), the display area is determined in an initial set area determined according to the instruction. In the display area change processing, the position and size are changed with respect to the initial set area. A start trigger of the display area change processing can be arbitrarily determined. For example, the activation of the HMD 100, in other words, the detection of the power supply ON may be determined as the start trigger. For example, a processing start request from the OS 150 or the specific application may be determined as the start trigger.

As shown in the drawing, if the processing is started, the CPU 140 acquires the flip-up angle $\theta$ detected by the angle sensor 95 (Step S110). The processing of Step S110 corresponds to the position detection unit 164. Next, the CPU 140 determines whether or not the flip-up angle $\theta$ satisfies any of the following conditions of (i) to (iii) (Step S120).

(i) $\theta < \theta 1$
(ii) $\theta 1 \leq \theta \leq \theta 2$
(iii) $\theta 1 > \theta 2$ However, $\theta 1$ is a first predetermined value, for example, 10°. $\theta 2$ is a second predetermined value greater than $\theta 1$, for example, 50°.

In Step S120, when it is determined that the flip-up angle $\theta$ is smaller than the first predetermined value $\theta 1$ (in the case of (i) described above), the CPU 140 determines a display area AI of an image as the initial set area (Step S125), thereafter, progresses the process to "RETURN", and temporarily ends the display area change processing. That is, when the flip-up angle $\theta$ is smaller than the first predetermined value $\theta 1$, the display area of the image is still the same full area as that at the time of the normal use.

In Step S120, when it is determined that the flip-up angle $\theta$ is equal to or greater than $\theta 1$ and equal to or smaller than $\theta 2$ (in the case of (ii) described above), the CPU 140 performs processing for setting a display area of an image based on the flip-up angle $\theta$ (Step S130). The processing of Step S130 corresponds to the display mode change unit 166.

Figure 6:
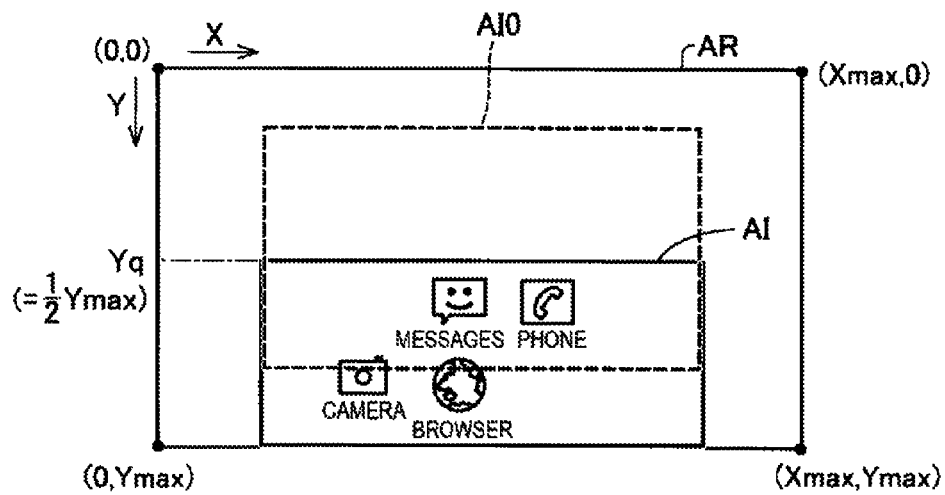
FIG. 6 is an explanatory view showing an example of a display area of an image displayed by the image display unit.

FIG. 6 is an explanatory view showing a display area of an image which is displayed by the image display unit 20. At the time of the normal use where the optical image display units 26 and 28 are at the first position P1 (FIG. 4), an initial set area AI0 indicated by a broken line in the drawing becomes a display area of an image. As described above, the initial set area AI0 is determined according to the instruction from the OS 150 or the specific application, and here, it is assumed that an initial set area corresponding to the image VI shown in FIG. 3 is determined. In contrast, the display mode change unit 166 (FIG. 2) virtually divides a full area AR into upper and lower regions, and determines such that the display area AI of the image falls within the lower divided region. A position to be divided in the sub scanning direction (Y direction) is referred to as Yq, and in Step S130, first, processing for finding the division position Yq is performed. Specifically, the display mode change unit 166 finds the division position Yq using the display area setting map 122 stored in the storage unit 120.

Figure 7:
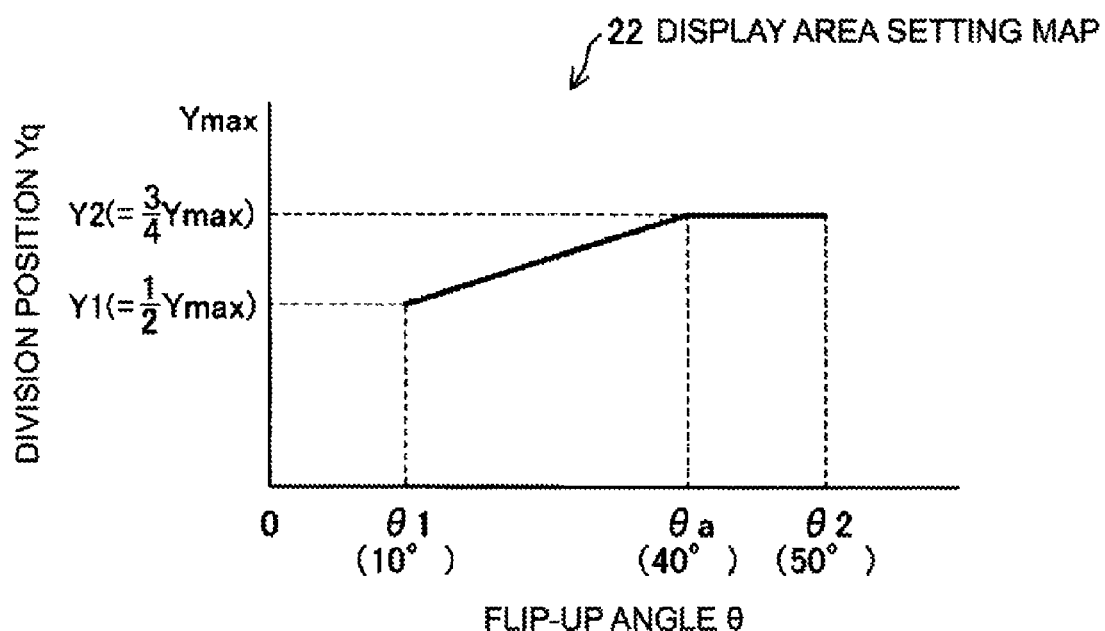
FIG. 7 is an explanatory view showing an example of a display area setting map.

FIG. 7 is an explanatory view showing an example of the display area setting map 122. As shown in the drawing, the display area setting map 122 is two-dimensional map data where the horizontal axis represents the flip-up angle $\theta$, the vertical axis represents the division position Yq, and the division position Yq corresponding to the flip-up angle $\theta$ is mapped. The relationship between the flip-up angle $\theta$ and the division position Yq is found by an experiment or a simulation in advance. That is, the optical image display units 26 and 28 are gradually moved until the flip-up angle $\theta$ becomes $\theta 2$ from $\theta 1$, and at each time, an experimenter turns the visual line upward to confirm in which range of a divided region an image can be visually recognized, thereby finding the relationship between the flip-up angle $\theta$ and the proper division position Yq.

According to the display area setting map 122 of FIG. 7, the division position Yq is gradually increased from the first position Y1 to the second position Y2 if the flip-up angle $\theta$ is from $\theta 1$ to $\theta a$, and is maintained at the second position Y2 if the flip-up angle θ exceeds θa. θa is a value greater than the first predetermined value θ1 and smaller than the second predetermined value θ2, and in this embodiment, θa is, for example, 40°. Y1 is, for example, (½)*Ymax, and Y2 is, for example, (¾)*Ymax.

In Step S130 of FIG. 5, the flip-up angle θ acquired in Step S110 is input to the display area setting map 122, and the division position Yq corresponding to the flip-up angle θ is read. In Step S130, the CPU 140 further finds the display area AI from the read division position Yq.

FIG. 6 is an explanatory view showing the display area AI when the flip-up angle θ is θ1. The division position Yq becomes the first position Y1, that is, (½)*Ymax. The display area AI is changed in only the position and length in the sub scanning direction (Y direction) with respect to the initial set area AI0 so as to fall below the first position Y1 while the position and length in the main scanning direction (X direction) are maintained. That is, the initial set area AI0 is changed to the display area AI. When the length of the initial set area AI0 in the sub scanning direction (Y direction) is shorter than the length from the division position Yq to the lowermost end (Ymax) in the main scanning direction, in this embodiment, a display area is determined such that the upper side thereof becomes the division position Yq.

Figure 8:
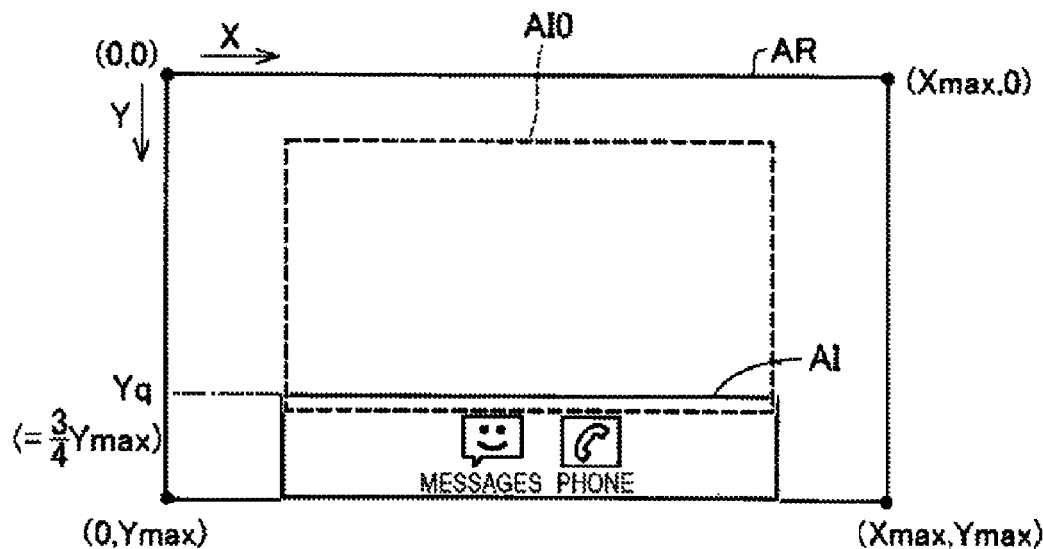
FIG. 8 is an explanatory view showing an example of a display area of an image displayed by the image display unit.

FIG. 8 is an explanatory view showing the display area AI when the flip-up angle θ is θa. If the flip-up angle θ becomes θa, the division position Yq becomes the second position Y2, that is, (¾)*Ymax. The display area AI is changed in only the position and length in the sub scanning direction (Y direction) with respect to the initial set area AI0 so as to fall below the second position Y2 while the position and length in the main scanning direction (X direction) are maintained. That is, the display area AI shown in the drawing is determined. When the length of the initial set area AI0 in the sub scanning direction (Y direction) is shorter than the length from the division position Yq to the lowermost end (Ymax) in the main scanning direction, in this embodiment, a display area is determined such that the upper side thereof becomes the division position Yq. As the flip-up angle θ is gradually increased from θ1 to θa, the display area AI is gradually decrease in the width in the Y direction from the state of FIG. 6 to the state of FIG. 8.

In Step S130, the CPU 140 further performs processing for designating the display area AI determined in the above-described manner with respect to the image processing unit 160. Specifically, the coordinate value of each apex of the display area AI is designated. Upon receiving the designation of the display area AI, the image processing unit 160 generates image data by combining an image corresponding to the display area AI displayed as the virtual image VI and dummy black data corresponding to the remaining portion excluding the image, and transmits generated image data to the image display unit 20 as right-eye image data Data1 and left-eye image data Data2. The image corresponding to the display area AI is a menu screen in the examples of FIGS. 6 and 8, and becomes an image where the lower side in the sub scanning direction is cut as the length of the display area AI in the sub scanning direction becomes shorter than the initial set area AI0. Upon receiving image data, the image processing unit 160 transmits received image data to the image display unit 20 as right-eye image data Data1 and left-eye image data Data2. After the execution of Step S130, the CPU 140 progresses the process to "RETURN" and temporarily ends the display area change processing.

In Step S120 of FIG. 5, when it is determined that the flip-up angle θ is greater than θ2 (in the case of (iii) described above), the CPU 140 performs processing for stopping the display of the image on the image display unit 20 (Step S140). Specifically, the CPU 140 transmits a request to make the virtual image non-display to the display control unit 190. Upon receiving the request, the display control unit 190 turns off the control signals for the right display drive unit 22 and the left display drive unit 24 to stop the generation of image light and to stop the display of the image. After the execution of Step S140, the CPU 140 progresses the process to "RETURN" and temporarily ends the display area change processing.

Figure 9:
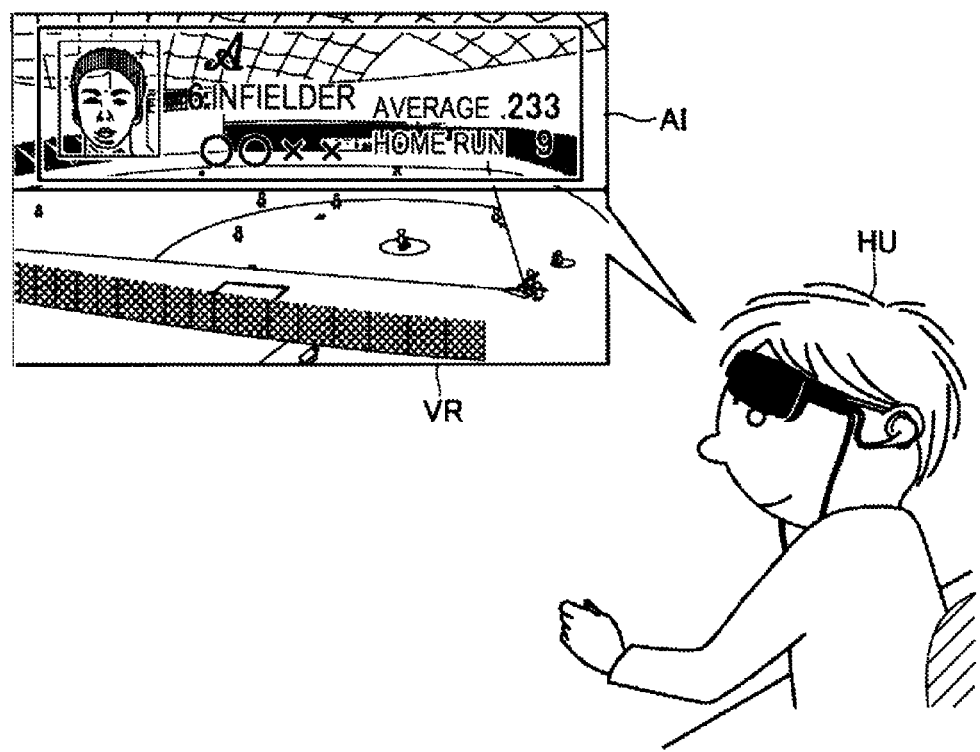
FIG. 9 is an explanatory view showing an example of a visual field of a user.

A-4. Effects of Embodiment:

According to the HMD 100 of this embodiment configured as above, if the image display unit 20 is flipped up by θ1 (=10°) from the first position P1, when divided into two upper and lower regions in the optical image display units 26 and 28, the display area AI is set in the lower region, and an image as a virtual image is displayed in the display area AI. For this reason, for example, as shown in FIG. 9, the user HU can capture the display area AI on the upper side of the visual field VR while recognizing an outside scene in front of the visual field VR. In the example shown in the drawing, the user can look at an image of player introduction while watching a baseball game. Therefore, the user can easily visually recognize the display area AI by turning the visual line upward (upward glance) in the middle of visually recognizing the outside scene. As a result, according to the HMD 100, it is possible to improve the convenience for the user.

As the flip-up angle θ of the image display unit 20 is gradually increased from θ1 (=10°) to θa (=40°), the size of the display area AI is gradually reduced in the length of the vertical direction from (½)*Ymax to (¼)*Ymax. The position of the display area AI is gradually moved downward in the sub scanning direction (Y direction). When the flip-up angle θ is θa (=40°), the state illustrated in FIG. 8 is placed. Therefore, it is possible to reduce the display area AI displayed on the optical image display units 26 and 28 according to the range of the optical image display units 26 and 28 which is decreased with an increase in the flip-up angle θ and can be visually recognized by the user. Therefore, the user can reliably and visually recognize the entire image displayed in the display area AI and to improve the convenience for the user. When the flip-up angle θ is in a range of θa to θ2 (40°≤θ≤50°), the state illustrated in FIG. 8 is maintained.

When the flip-up angle θ of the image display unit 20 is greater than θ2 (=50°), the display of the image on the image display unit 20 is stopped. When the user does not need to look at the display of the image, the user flips up the image display unit 20 such that the flip-up angle θ becomes greater than θ2, thereby confirming an actual visual field with naked eyes. In this case, the display of the image is stopped. For this reason, since the image is not displayed in a state where the image display unit 20 is flipped up largely, it is possible to prevent the display image from being peeped by another person. Furthermore, since the display of the image is stopped, it is possible to avoid wasteful power consumption. The configuration of Step S140 in which the display of the image is stopped may be changed to a configuration in which the power supply of the HMD 100 is shut off, and in this case, it is possible to further achieve power saving.

Besides, according to the HMD 100 of this embodiment, when the image display unit 20 is returned to the first position P1, the temporarily changed display area AI is returned to the original full area. For this reason, it is possible to allow easy return to the full area, and the convenience for the user is excellent.

A-5. Modification Example of Embodiment:

In the first embodiment, as the display mode change unit, the position and size of the display area are changed, and an image displayed in the display area becomes an image where the lower portion is cut according to the size of the display area using an image displayed before flip-up. In contrast, as a modification example, image parts constructing an image displayed before flip-up are recombined, and the recombined image may be displayed in the display area. Recombination of image parts may be referred to as reconstruction of an image.

Figure 10:
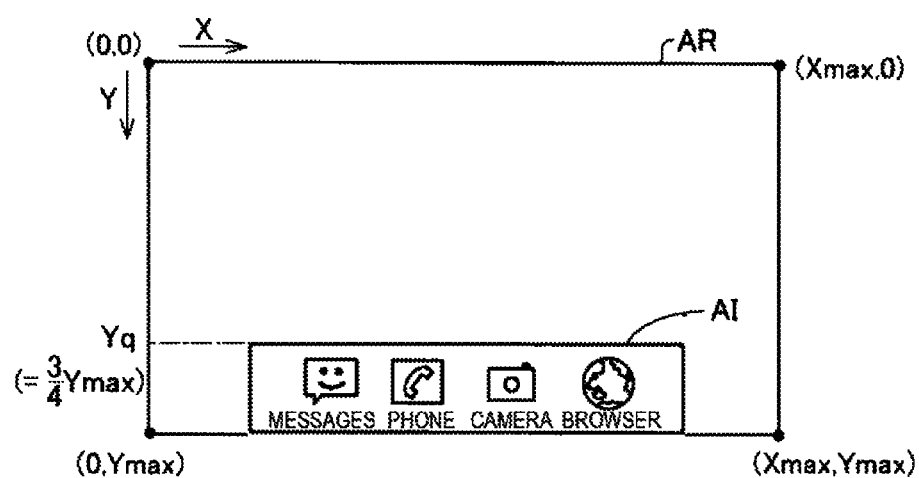
FIG. 10 is an explanatory view showing an example of reconstruction of an image when an image part is an icon.

FIG. 10 is an explanatory view showing an example of reconstruction of an image when an image part is an icon. In the illustration of FIG. 8, although the icons of "CAMERA" and "BROWSER" shown in FIG. 6 are cut, in contrast, as shown in FIG. 10, the arrangement positions of the icons may be changed such that all icons included in a menu screen, that is, the icons "MESSAGES", "PHONE", "CAMERA", and "BROWSER" fail within the display area AI.

When an image part constructing an image is, for example, a manual, an image may be reconstructed by discarding information with less importance while leaving information with high importance.

Figure 11:
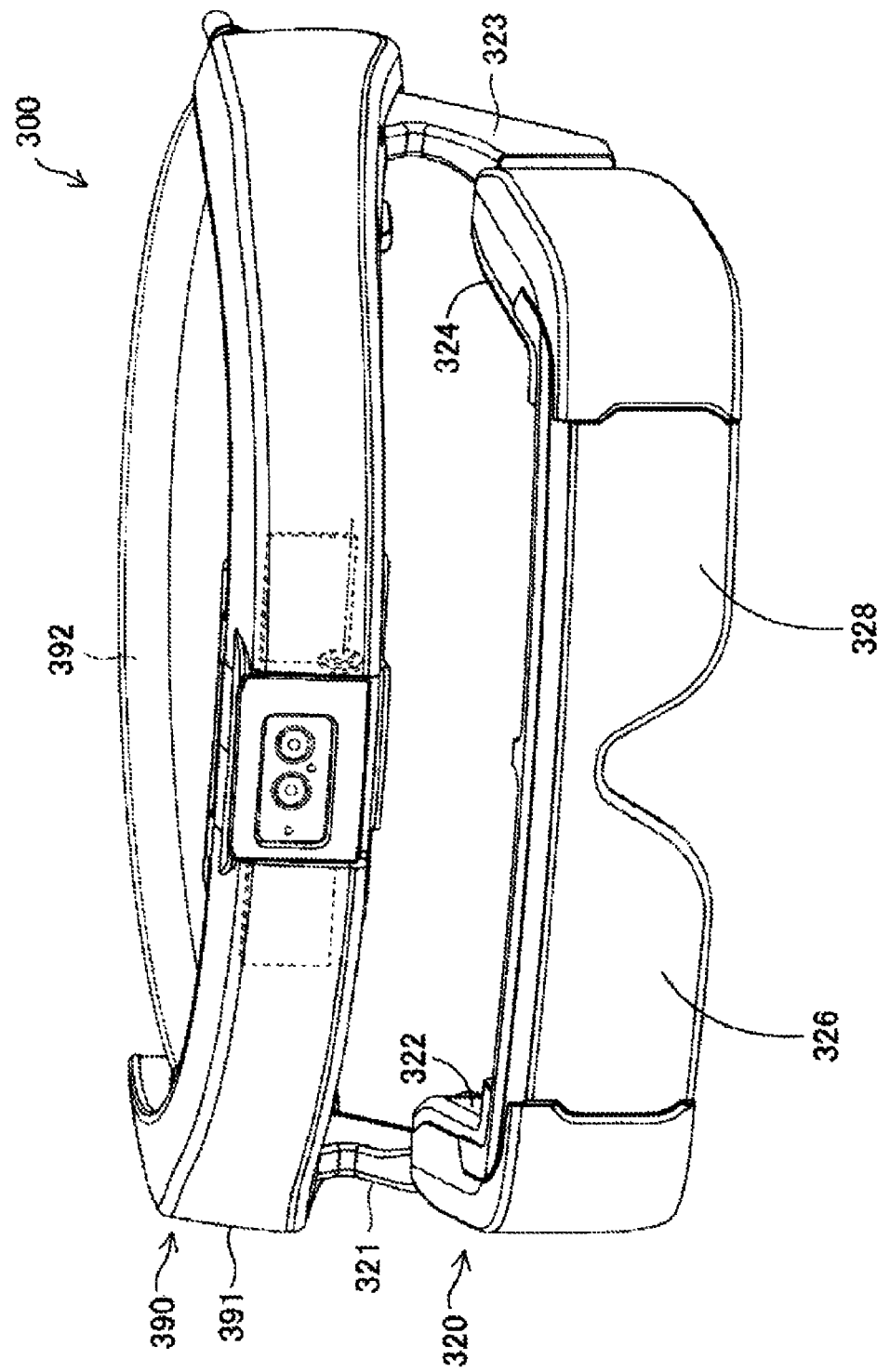
FIG. 11 is an explanatory view showing the schematic configuration of a head mounted display device according to a second embodiment of the invention.

B. Second Embodiment:

FIG. 11 is an explanatory view showing the schematic configuration of a head mounted display device according to a second embodiment of the invention. Similarly to the HMD 100 of the first embodiment, a head mounted display device (HMD) 300 in the second embodiment includes a mounting belt 390, an image display unit 320, and a control unit (not shown). The functions of the mounting belt 390, the image display unit 320, and the control unit are substantially the same as the functions of the mounting belt 90, the image display unit 20, and the control unit 10 of the first embodiment, and the shapes of the mounting belt 390 and the image display unit 320 are different from the shapes of the mounting belt 90 and the image display unit 20 of the first embodiment. That is, the HMD 300 of the second embodiment is a model where the shape is changed with respect to the HMD 100 of the first embodiment. In the second embodiment, the parts corresponding to those in the first embodiment are represented by reference numerals of 300s with the common last two digits, and detailed description of the functions will be omitted.

As in the first embodiment, the mounting belt 390 includes a mounting base portion 391 and a belt portion 392. Although the belt portion 92 of the first embodiment is made of cloth, the belt portion 392 of the second embodiment is made of resin the same as the mounting base portion 391.

As in the first embodiment, the image display unit 320 includes a right holding unit 321, a right display drive unit 322, a left holding unit 323, a left display drive unit 324, a right optical image display unit 326, and a left optical image display unit 328.

Figure 12:
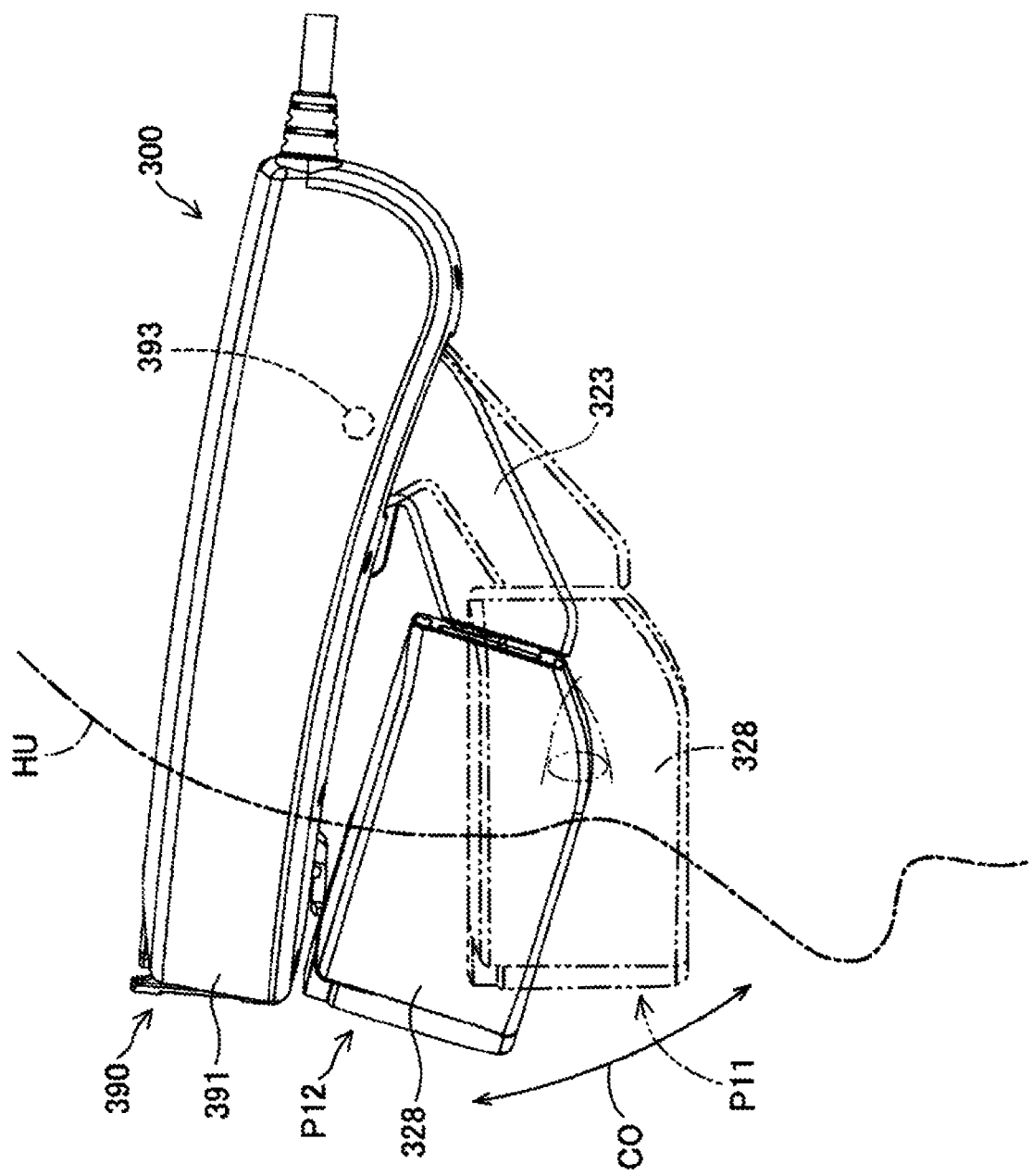
FIG. 12 is an explanatory view showing a state of rotation of an image display unit.

FIG. 12 is an explanatory view showing a state of rotation of the image display unit 320. In FIG. 12, only the left optical image display unit 328 is shown, and only the left side is representatively shown. The right side is the same as the left side. The left holding unit 323 is connected to the mounting base portion 391 by a connection portion 393. With this, the optical image display unit 328 can move (rotate) to an arbitrary position between a first position P11 and a second position P12 on a circular orbit CO with the connection portion 393 as a center. The first position P11 is a position where the optical image display unit 328 is disposed in front of the eyes of the user HU.

Figure 13:
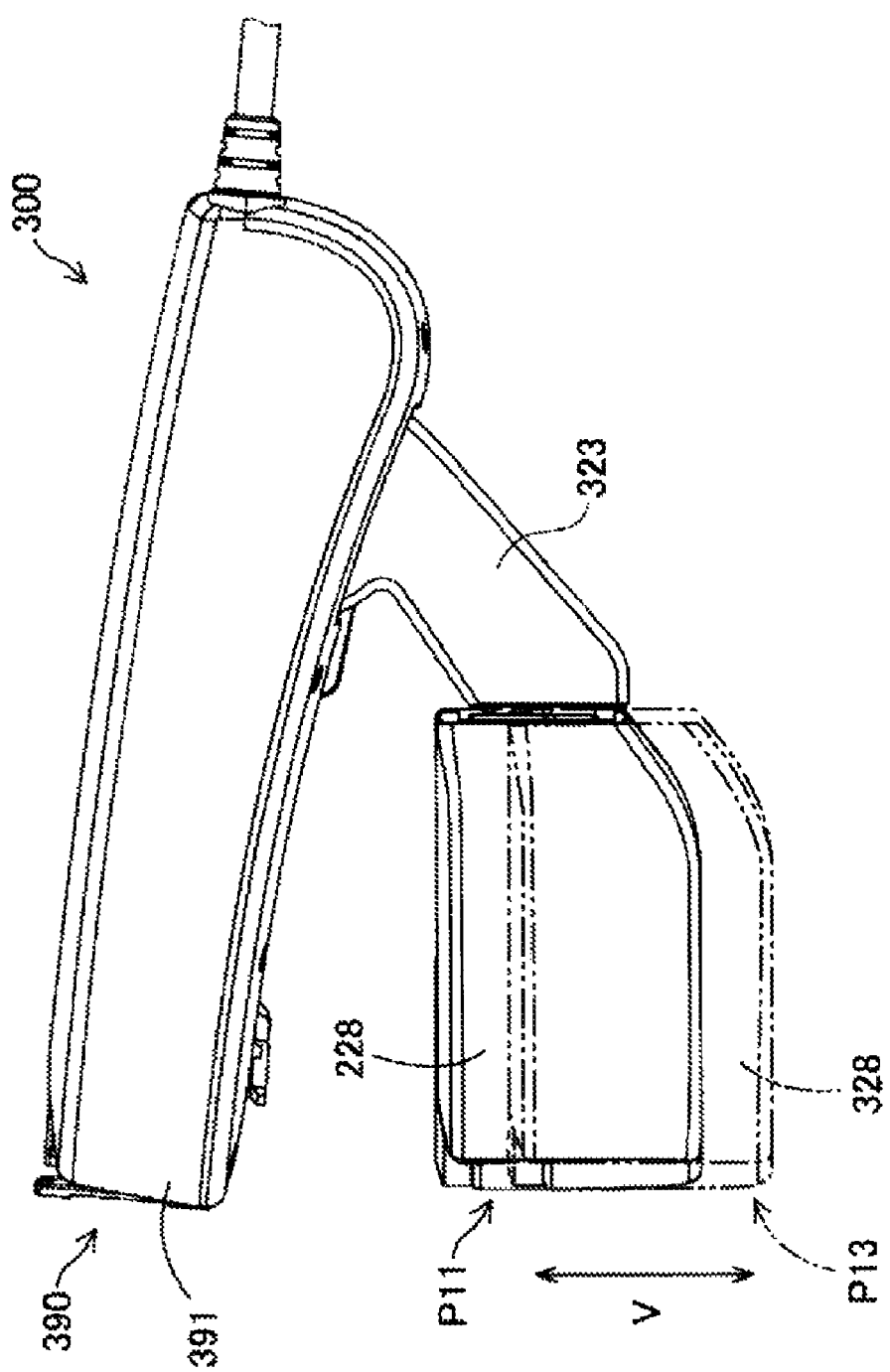
FIG. 13 is an explanatory view showing a state of slide movement of the image display unit.

FIG. 13 is an explanatory view showing a state of slide movement of the image display unit 320. As described above, although the image display unit 320 rotates, in addition, in the HMD 300 of this embodiment, the image display unit 320 can move in the up-down direction. In detail, the right and left optical image display units 326 and 328 can slide and move in the up-down direction V with respect to the right and left holding units 321 and 323. The "up-down direction V" used herein is a direction along the display surfaces of the optical image display units 326 and 328, and when the image display unit 320 is at the first position P11, becomes a vertical direction.

Figure 14:
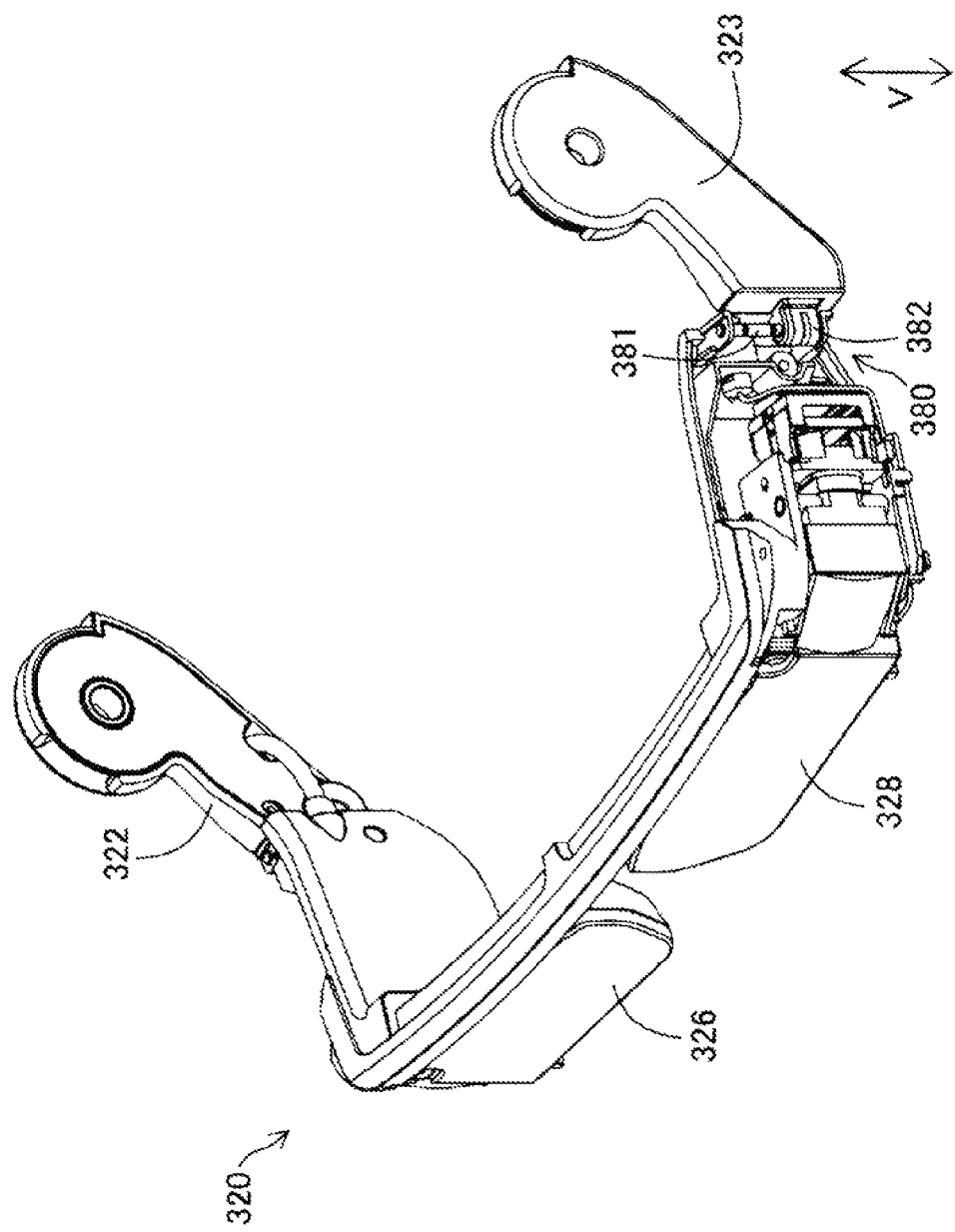
FIG. 14 is a perspective view showing the internal configuration near an end portion of a left optical image display unit.

FIG. 14 is a perspective view showing the internal configuration near the end portion EL of the left optical image display unit 328. In FIG. 14, although the internal configuration near the end portion EL of the left optical image display unit 328 is shown, the right side is the same as the left side. The movement in the up-down direction V described above is implemented by a slide mechanism 380 embedded near the end portion EL of the left optical image display unit 328.

The slide mechanism 380 is provided with a guide rail 381 and a slide member 382. The guide rail 381 is a rod-like member, and is connected to the left optical image display unit 328 side. The slide member 382 is connected to the left holding unit 323, and the guide rail 381 is inserted thereinto. Although the detailed internal configuration of the slide member 382 is omitted, the slide member 382 can move in a stepwise manner along the guide rail 381. The slide mechanism 380 is provided with a displacement sensor (not shown), and the position of the slide member 382 with respect to the guide rail 381 can be detected by the displacement sensor. As the displacement sensor, various types, such as an optical sensor, a magnetic sensor, and an ultrasonic sensor, can be used.

The right and left optical image display units 326 and 328 can slide and move in the up-down direction V with respect to the right and left holding units 321 and 323 by the operation of the slide mechanism 380. That is, the right and left optical image display units 326 and 328 can move (slide and move) to an arbitrary position between the first position P11 and the third position P13. The slide movement is performed manually by the user, and is possible in a state in which the HMD 300 is mounted on the head. The movement position can be detected by the displacement sensor described above.

Similarly to the control unit of the HMD 100 of the first embodiment, the control unit of the HMD 300 of this embodiment executes the display area change processing (FIG. 5) for changing a display area according to the flip-up angle θ of the image display unit 320, that is, the rotation position of the optical image display units 326 and 328. In this embodiment, processing for changing a display area according to the movement position of the optical image display units 326 and 328 in the up-down direction is also executed.

Figure 15:
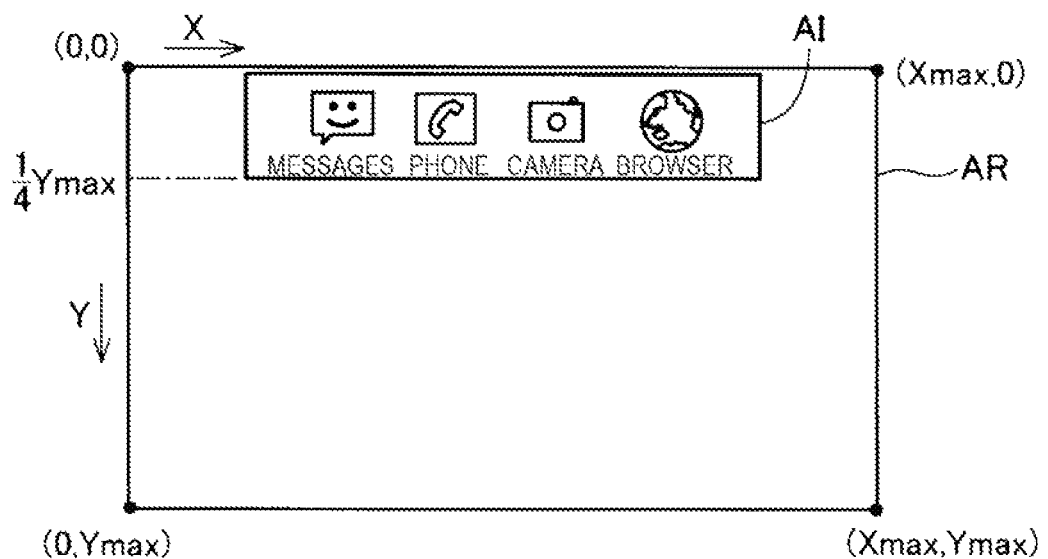
FIG. 15 is an explanatory view showing a display area when an optical image display unit is moved to a third position.

FIG. 15 is an explanatory view showing a display area AI when the optical image display units 326 and 328 are moved to a third position P13 (FIG. 13). As shown in FIG. 15, the display area AI is set to an upper position of the full area AR, that is, in a range of a sub scanning position of 0 to (¼)*Ymax. A menu screen is displayed in the display area AI. As in the modification example of the first embodiment shown in FIG. 10, the arrangement positions of the icons of the menu screen are changed such that the icons of "MESSAGES", "PHONE", "CAMERA", and "BROWSER" fall within the display area AI. As the modification example of the first embodiment, in place of a configuration in which image parts constructing an image are recombined, as shown in FIG. 8 of the first embodiment, an image where the lower portion is cut according to the size of the display area.

According to the HMD 300 of the second embodiment configured as above, similarly to the HMD 100 of the first embodiment, the display area is changed according to the rotation position of the optical image display units 326 and 328. Besides, the display area is changed according to the movement position of the optical image display units 326 and 328 in the up-down direction. For this reason, when the optical image display units 326 and 328 are rotated or moved in the up-down direction, the mode of the display of the image on the optical image display units 326 and 328 is switched to an appropriate mode to continue the display. Therefore, according to the HMD 300 of this form, as in the first embodiment, it is possible to improve the convenience for the user.

C. Modification Examples:

The invention is not limited to the first and second embodiments and the modification examples thereof, and may be carried out in various forms without departing from the spirit of the invention. For example, the following modification examples can be made.

MODIFICATION EXAMPLE 1

A person can visually recognize an object in a visual field which is a given range centering on a viewpoint. In general, when the distance from a viewpoint to an object is the same, the person can visually recognize an object in a visual field close to the viewpoint more clearly. An area within about 5 degrees centering on the viewpoint is referred to as a discrimination visual field where a visual function, such as visual acuity, is excellent. An area within about 30 degrees in the horizontal direction centering on the viewpoint and within about 20 degrees in the vertical direction centering on the viewpoint is referred to as an effective visual field where an object can be recognized instantly only by eye movement. An area within about 60 to 90 degrees in the horizontal direction centering on the viewpoint and within about 45 to 70 degrees in the vertical direction centering on the viewpoint is referred to as a stable fixation field where the user can recognize an object reasonably by moving the eyes or moving the head.

Figure 16:
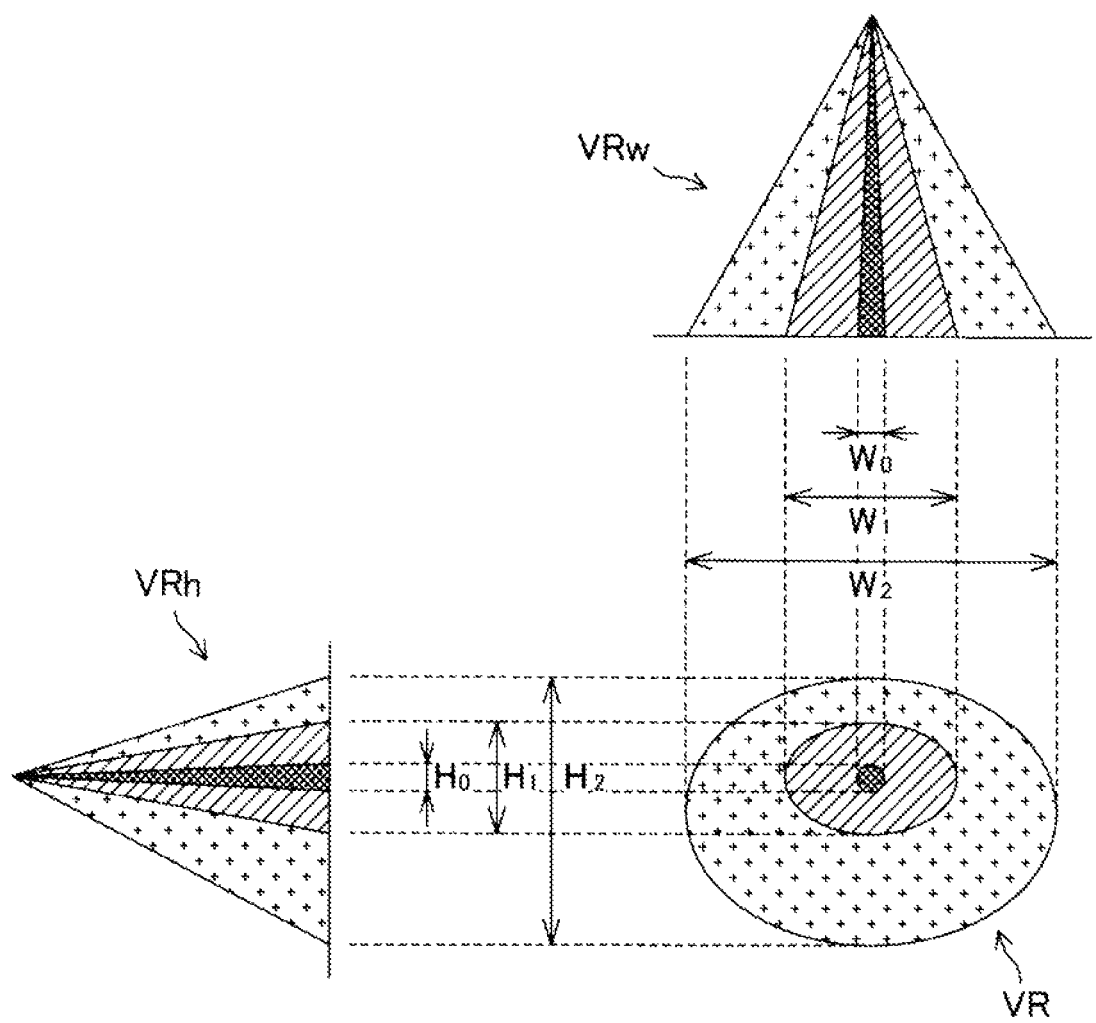
FIG. 16 is a schematic view of a horizontal visual field and a vertical visual field centering on a viewpoint.

FIG. 16 is a schematic view of a horizontal visual field VRw and a vertical visual field VRh centering on a viewpoint. In FIG. 16, the relationship of a discrimination visual field, an effective visual field, and a stable fixation field in the horizontal direction and the vertical direction is shown. In FIG. 16, when the user looks at a specific position, the visual field VR which can be visually recognized centering on the viewpoint, the horizontal visual field VRw for illustrating the visual field VR by dividing the visual field VR into horizontal direction components, and the vertical visual field VRh for illustrating the visual field VR by dividing the visual field VR into vertical direction components are shown. In FIG. 16, the discrimination visual field, the effective visual field, and the stable fixation field are represented like the following relationships (a) to (c). In the relationship (a), the angle in parentheses is an angle on one side centering on the viewpoint.

discrimination visual field: W0, H0 (to about 5 degrees) (a)

effective visual field: W1 (to about 30 degrees), H1 (to about 20 degrees) (b)

stable fixation field: W2 (to about 60 (90) degrees), H2 (to about 45 (70) degrees) (c)

As shown in FIG. 16, in the vertical direction of the visual field VR, the stable fixation field or the like is a wider range on the lower side than the upper side. This indicates that a person visually recognize the lower side more easily than the upper side along the vertical direction.

In the first embodiment and the second embodiment, as described above, a position where the optical image display unit is disposed in front of the user's eyes in the horizontal direction is set as the first position. In contrast, when it is assumed that the HMD is used to give priority on looking at the display of the optical image display unit and to look at the hand in an actual visual field at a downward glance, a position where the optical image display unit is on the slightly upper side (for example, 5 degrees) with respect to the light in the horizontal direction of the eye may be set as the first position in consideration of the discrimination visual field. According to this configuration, the optical image display unit is on the slightly upper side, whereby the user can consciously confirm, display as a virtual image. The first position is not necessarily limited to the first and second embodiments, or the modification examples described above, and may be set to any position as long as the position is a predetermined position near the front of the user's eyes. Besides, the first position is not necessarily limited to a position near the front of the user's eyes, and may be set to a position not near the front of the user's eyes.

MODIFICATION EXAMPLE 2

In the first and second embodiments and the modification examples thereof, the "first position" is set to a position in front of the user's eyes, and the "second position" is set to a position different from a position in front of the eyes. In contrast, as a modification example, the "first position" may be set to a position different from a position in front of the eyes. Besides, as another modification example, when a position in front of the eyes is considered to be an area having a certain width, the "first position" is set to a standard position in front of the user's eyes, and the "second position" is set to another position in front of the user's eyes. In summary, any configuration can be made as long as the display unit is able to take a first position which is a relative position with respect to the user's eyes and a second position which is a relative position with respect to the eyes and is different from the first position.

MODIFICATION EXAMPLE 3

In the first and second embodiments and the modification examples thereof, although the image display unit is provided so as to be rotatable with respect to the mounting belt mountable on the head of the user, alternatively, the image display unit may be provided so as to be rotatable with respect to a hat, such as a helmet. As shown in JP-A-2012-173664, the image display unit may be provided with respect to a holder erected around the head, or the like, and any configuration can be made as long as the image display unit can be mounted on the mounting base portion mountable on the user.

MODIFICATION EXAMPLE 4

In the second embodiment, the optical image display unit is rotatable around the axis and movable in the up-down direction. In contrast, as a modification example, the rotation may be impossible and only the movement in the up-down direction may be possible. In the second embodiment or the modification example thereof, the movement direction may be a right-left direction in place of the up-down direction. Besides, the movement direction may be both the up-down direction and the right-left direction, or may be another direction other than the up-down direction.

MODIFICATION EXAMPLE 5

In the configuration described in Modification Example 4 described above in which the display unit slides in the right-left direction, the visual line of the user moves right and left. Therefore, in this case, the display mode change unit may display only the optical image display unit on the movement direction side of the right and left optical image display units based on the slide position or displacement of the display unit. That is, when the display unit is moved to the right, only the right display unit may be displayed, and when the display unit is moved to the left, only the left display unit may be displayed. According to this configuration, it is possible to allow the user to look at the optical image display unit on the side on which the display is performed at a sidelong glance. As another modification example, the position of the display area in each optical image display unit may be deviated to the movement direction side.

MODIFICATION EXAMPLE 6

In the first and second embodiments or the modification examples, although the display mode of the image is changed based on the displacement (rotation angle, slide displacement) of the optical image display unit from the first position, alternatively, the display mode may be changed based on a displacement of the optical image display unit from another position. Furthermore, in the first and second embodiments or the modification examples, the displacement of the optical image display unit from the first position is detected by the angle sensor or the displacement sensor, alternatively, the direction of the visual line of the user may be detected and the position of the optical image display unit may be estimated from the direction of the visual line. As a method of detecting the visual line direction of the user, an opthalmographing camera may be disposed in a portion not involved in the movement of the optical image display unit, the right and left eyes of the user may be imaged, and the obtained images of the eyes may be analyzed to detect the direction of the visual line of the user. In addition to the opthalmographing camera, a near infrared LED may be included. Near infrared light invisible to the eye is irradiated by the near infrared LED, and reflection on the surface (cornea) of the eye caused by near infrared light is detected. The visual line direction can be calculated from two positional relationships of a pupil and cornea reflection. Alternatively, a muscle activity sensor which can detect tension and relaxation of muscles (for example, corrugator supercilii muscles, orbicularis oculi muscles) around the user's eyes may be provided, and the visual line direction of the user may be detected based on an output value from the muscle activity sensor.

MODIFICATION EXAMPLE 7

In the first and second embodiments or the modification examples, as the display mode change unit, although the position and size of the display area are changed, alternatively, only the position of the display area may be changed, or only the size of the display area may be changed. In place of a configuration in which the display area is changed, brightness, luminance, transmittance of image display may be changed. For example, brightness of an image is changed to ½, ⅓, ¼, or the like of the normal. In place of a configuration in which the display area is changed, the color of image display in the display area may be changed. For example, when the optical image display unit is flipped up, the upper half of the display area may be made white display, and the lower half of the display area may be made color display. In place of a configuration in which the display area is changed, an area where an image is displayed may be changed using electronic shade technology. In place of a configuration in which the display area is changed, the size of a character or an image may be increased. Besides, parallax of right and left display image may be changed to perform 3D display, and a change may be made to a display mode in which a depth feeling is given. In summary, any configuration may be made as long as the mode of the display continued on the display unit is changed. The change of the mode of the display as the display mode change unit does not include a change to stop the display.

MODIFICATION EXAMPLE 8

In the first and second embodiments or the modification examples, when the flip-up angle θ is between θ1 (=10°) to θa (=40°), the size of the display area is gradually decreased; however, the size of the display area may be switched in a stepwise manner, for example, in two steps or three steps. In the first and second embodiments or the modification examples, when the flip-up angle θ becomes greater than θ2 (=50°), the display of the image is stopped; however, in place of this, a warning message may be displayed in the display area.

MODIFICATION EXAMPLE 9

In the first and second embodiments or Modification Example 1, although the head mounted display in which the image display unit itself can be moved is provided, in place of this, the display unit may not be moved, and a display area on the display unit may be electronically moved, that is, the pixel position of the display area displayable moves inside the display unit. When the display area moves from a position in front of the eyes to another position, the mode of the display continued in the display area may be changed.

Figure 17:
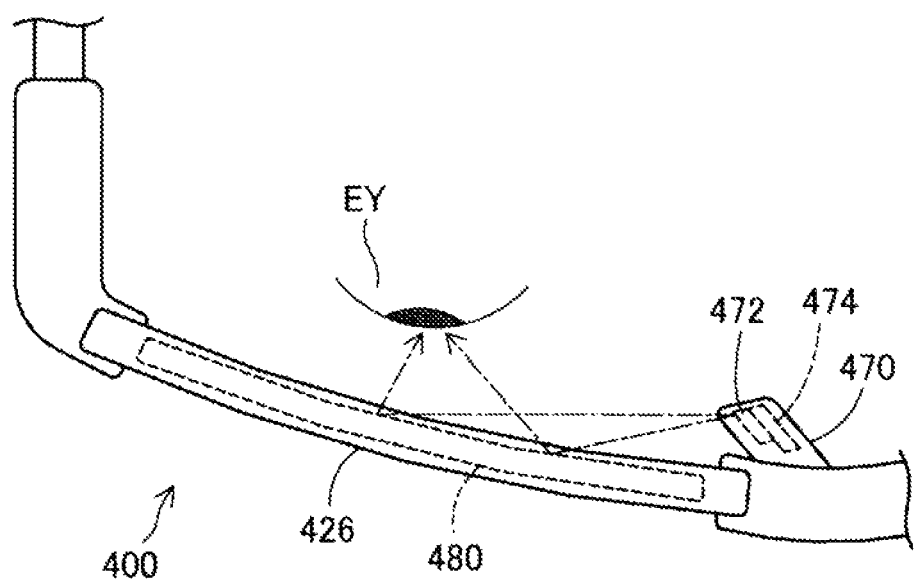
FIG. 17 is an explanatory view showing a portion of an HMD in Modification Example 9.

FIG. 17 is an explanatory view showing a portion of a head mounted display device in Modification Example 9. In FIG. 17, a right optical image display unit 426 and the periphery thereof of a head mounted display device (HMD) 400 in Modification Example 9 are shown. Though not shown, a left optical image display unit and the periphery thereof have the same configuration as the right optical image display unit 426 and the periphery thereof. As shown in the drawing, a right nose pad 470 is provided with a scanning optical system including a MEMS mirror 472. Image light is projected onto the scanning optical system by an optical fiber (not shown), and scanning is performed in a two-dimensional direction by the scanning optical system. Scanning light scanned is emitted from the MEMS mirror 472 toward a diffraction grating (fine reflection structure) 480 embedded in the right optical image display unit 426. Scanning light is scanned on the surface of the diffraction grating 480, whereby a virtual image by image light is formed. The user captures the virtual image with the eyes EY to recognize an image.

The MEMS mirror 472 is disposed in a mounting base portion 474, and the mounting base portion 474 is changed in inclination by a drive mechanism (not shown). The drive mechanism operates in response to an instruction from the user. An area (that is, the display area) where scanning light is scanned on the surface of the diffraction grating 480 corresponds to a "display unit" in an aspect of the invention described in "SUMMARY", and the display area can take the first position and the second position with a change in the inclination of the mounting base portion 474.

In Modification Example 9, although the MEMS mirror is embedded in the nose pad, in place of this, the MEMS mirror may be disposed outside the HMD, that is, outside the optical image display unit.

OTHER MODIFICATION EXAMPLES

In the foregoing embodiments, the configuration of the head mounted display has been illustrated. However, the configuration of the head mounted display can be arbitrarily determined without departing from the spirit of the invention, and for example, addition, deletion, conversion, and the like of the components can be performed.

In the foregoing embodiments, the allocation of the components to the control unit and the image display unit is only an example, and various forms can be utilized. For example, the following forms may be utilized; (i) a form in which processing functions, such as a CPU and a memory, are mounted on the control unit, and only a display function is mounted on the image display unit, (ii) a form in which processing functions, such as a CPU and a memory, are mounted on both of the control unit and the image display unit, (iii) a form in which the control unit and the image display unit are integrated (for example, a form in which the control unit is included in the image display unit and functions as an eyeglass-type wearable computer), (iv) a form in which a smartphone or a portable game machine is used instead of the control unit, and (v) a form in which the connection unit (cord) is eliminated by configuring the control unit and the image display unit to be capable of communicating with each other in a wireless manner and capable of being supplied with electric power in a wireless manner.

In the foregoing embodiments, for convenience of description, the control unit includes the transmission unit, and the image display unit includes the reception unit. However, both of the transmission unit and the reception unit of the foregoing embodiments has a function for enabling bidirectional communication and can function as a transmission and reception unit. For example, the control unit shown in FIG. 2 is connected to the image display unit through a wired signal transmission line. However, the control unit and the image display unit may be connected through a wireless signal transmission line, such as wireless LAN, infrared communication, or Bluetooth (Registered Trademark).

For example, the configurations of the control unit and the display unit shown in the foregoing embodiments can be arbitrarily changed. Specifically, for example, the touch pad may be removed from the control unit, and the control unit may be operated only by the cross key. Another interface for operation, such as a stick for operation, may be provided in the control unit. Devices, such as a keyboard and a mouse, may be connectable to the control unit, and the control unit may receive inputs from the keyboard and the mouse. For example, in addition to the operation input by the touch pad and the cross key, the control unit may acquire an operation input by a footswitch (a switch operated by the foot of the user). For example, a visual line detection unit, such as an infrared sensor, may be provided in the image display unit, and the control unit may detect a visual line of the user and acquire an operation input by a command associated with a motion of the visual line. For example, the control unit may detect a gesture of the user using a camera and acquire an operation input by a command associated with the gesture. When detecting a gesture, the control unit can use, as a mark for motion detection, the fingertip of the user, a ring worn on the hand of the user, a medical instrument held by the user, or the like. If the control unit can acquire the operation inputs by the footswitch and the visual line, even in work in which it is difficult for the user to release the hand, the input information acquisition unit can acquire an operation input from the user.

Figure 18A:
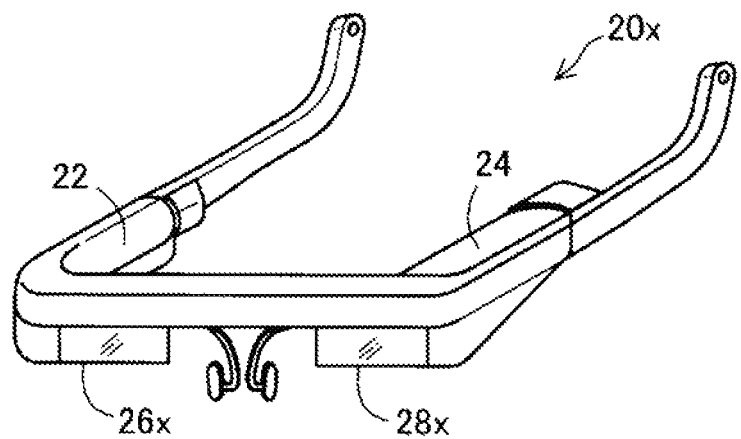
FIGS. 18A and 18B are explanatory views showing the appearance configuration of an image display unit of an HMD in a modification example.
Figure 18B:
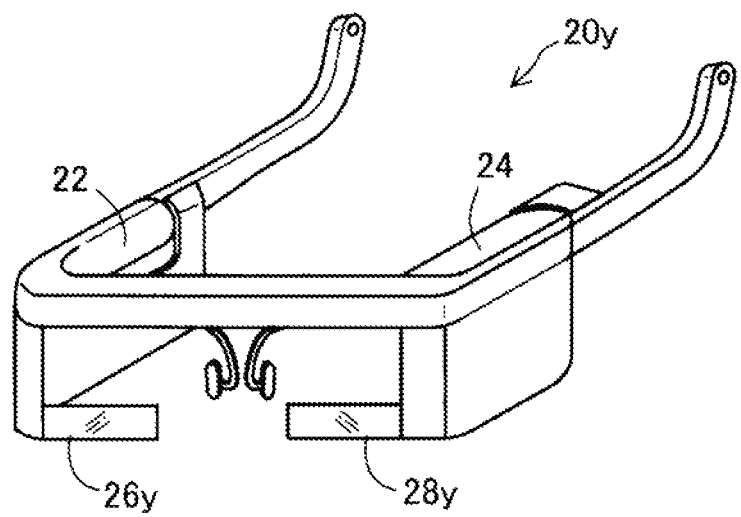

FIGS. 18A and 18B are explanatory views showing the appearance configuration of an image display unit of an HMD in a modification example. In an example of FIG. 18A, an image display unit 20x includes a right optical image display unit 26x instead of the right optical image display unit 26, and includes a left optical image display unit 28x instead of the left optical image display unit 28. The right optical image display unit 26x and the left optical image display unit 28x are formed smaller than the optical member in the foregoing embodiments, and are disposed obliquely above the right eye and the left eye at the time of mounting of the HMD. In an example of FIG. 18B, an image display unit 20y includes a right optical image display unit 26y instead of the right optical image display unit 26, and includes a left optical image display unit 28y instead of the left optical image display unit 28. The right optical image display unit 26y and the left optical image display unit 28y are formed smaller than the optical member in the foregoing embodiments, and are disposed obliquely above the right eye and the left eye of the user at the time of mounting of the HMD. In this way, the optical image display unit only has to be disposed near the eye of the user. The size of the optical member forming the optical image display unit is arbitrary, and the HMD can be implemented as an HMD of a form in which the optical image display unit covers a part of the eye of the user, in other words, a form in which the optical image display unit does not completely cover the eye of the user.

For example, although the head mounted display is a binocular transmissive head mounted display, the head mounted display may be configured as a monocular head mounted display. Besides, the head mounted display may be configured as a non-transmissive head mounted display in which transmission of an outside scene is blocked in a state where the user mounts the head mounted display.

For example, the functional units, such as the image processing unit, the display control unit, and the sound processing unit, are described as being implemented by the CPU expanding and executing the computer program stored in the ROM or the hard disk. However, the functional units may be configured using an application specific integrated circuit (ASIC) designed to implement the functions.

For example, in the foregoing embodiments, although the image display unit is the head mounted display mounted like eyeglasses, the image display unit may be a normal flat display device (a liquid crystal display, a plasma display, an organic EL display, or the like). In this case, the control unit and the image display unit may be connected through a wired signal transmission line or may be connected through a wireless signal transmission line. Consequently, the control unit can also be used as a remote controller of a normal flat display device.

As the image display unit, for example, an image display unit of another shape, such as an image display unit mounted like a hat may be utilized instead of the image display unit mounted like eyeglasses. As the earphone, an ear hook type or a headband type may be utilized. The earphone may be omitted. For example, the image display unit may be configured as a head-up display (HUD) mounted on a vehicle, such as an automobile or an airplane.

For example, in the foregoing embodiments, the display drive unit is configured as the backlight, the backlight control unit, the LCD, the LCD control unit, and the projection optical system. However, the form described above is only for illustration. The display drive unit may include components for implementing another system in addition to the components or instead of the components. For example, the display drive unit may include an organic electroluminescence (EL) display, an organic EL control unit, and a projection optical system. For example, the display drive unit can use a digital micro-mirror device (DMD) or the like instead of the LCD. For example, the display drive unit may include a signal light modulation unit which includes a color light source for generating respective color light of RGB and a relay lens, a scanning optical system including a MEMS mirror, and a drive control circuit which drives the signal light modulation unit and the scanning optical system. In this way, even if an organic EL, a DMD, or a MEMS mirror is used, "an emission area in the display drive unit" is a certainly an area where image light is actually emitted from the display drive unit, and the emission area in each device (display drive unit) is controlled in the same manner as in the foregoing embodiments, whereby it is possible to obtain the same effects as in the foregoing embodiments. For example, the display drive unit may include one or more lasers which emit laser having intensity according to an pixel signal to the retina of the user. In this case, "the emission area in the display drive unit" represents an area where laser light representing an image is actually emitted from the display drive unit. The emission area of laser light in the laser (display drive unit) is controlled in the same manner as in the foregoing embodiments, whereby it is possible to obtain the same effects as in the foregoing embodiments.

The invention is not limited to the embodiments, the examples, and the modification examples described above and can be implemented in various configurations without departing from the spirit of the invention. For example, the technical features in the embodiments, the examples, and the modifications corresponding to the technical features in the aspects described in the summary can be replaced or combined as appropriate in order to solve a part or all of the problems or in order to attain a part or all of the effects. Unless the technical features are described in this specification as essential technical features, the technical features can be deleted as appropriate.

The entire disclosure of Japanese Patent Application Nos. 2014-177097, filed Sep. 1, 2014 and 2015-097355, filed May 12, 2015 are expressly incorporated by reference herein.

What is claimed is:

1. A display device comprising:
   a display unit which is able to take a first position which is a relative position with respect to user's eye and a second position which is a relative position with respect to the eyes and is different from the first position, wherein the first position and the second position are positions in front of the user's eyes; and
   a central processing unit which, when the display unit displaying an image at the first position is moved to the second position, continues the image displayed on a display area of the display unit at the first position without turning off the image but changes a position of parts of the image relative to the display area of the display unit.

2. The display device according to claim 1, further comprising:
   a sensor that detects a rotation position of the display unit from the first position, wherein:
      the display unit is provided so as to be rotatable with respect to a mounting base mountable on the head of the user, and
      the central processing unit changes the mode of the display based on the detected rotation position.

3. The display device according to claim 2,
   wherein the sensor is an angle sensor which detects a rotation angle from the first position.

4. The display device according to claim 2,
   wherein the central processing unit stops the display of the image on the display unit when the rotation position detected by the sensor is a position at a distance equal to or greater than a predetermined threshold value from the first position.

5. The display device according to claim 1, further comprising:
   a sensor that detects a movement position of the display unit from the first position, wherein:
      the display unit is provided so as to be movable from the first position in a predetermined direction, and
      the central processing unit changes the mode of the display based on the detected movement position.

6. The display device according to claim 5,
   wherein the predetermined direction is at least one direction of an upward direction and a downward direction.

7. The display device according to claim 1,
   wherein the central processing unit changes the position and size of the display area when the display unit is moved to the second position.

8. The display device according to claim 7,
   wherein the display unit has a configuration of being able to be moved in an upward direction from the first position, and
   the central processing unit changes the display area to a lower side of the display unit as the change of the position.

9. The display device according to claim 1,
   wherein the central processing unit changes brightness of the display of the image as the mode of the display to be changed.

10. The display device according to claim 1,
    wherein the central processing unit returns the mode of the display to the mode displayed at the first position when the display unit is returned from the second position to the first position.

11. The display device according to claim 1,
    wherein the display unit displays the image to allow the user mounted with the display device to visually recognize the image and is able to transmit an outside scene.

12. A method of controlling a display device including a display unit which is able to take a first position which is a relative position with respect to user's eye and a second position which is a relative position with respect to the eyes and is different from the first position, wherein the first position and the second position are positions in front of the user's eyes, the method comprising:

when the display unit displaying an image at the first position is moved to the second position, continuing the image displayed on a display area of the display unit at the first position without turning off the image but changing a position of parts of the image relative to the display area of the display unit.

13. A non-transitory computer readable medium that includes control logic for controlling a display device including a display unit which is able to take a first position which is a relative position with respect to user's eye and a second position which is a relative position with respect to the eyes and is different from the first position, wherein the first position and the second position are positions in front of the user's eyes, the control logic continuing an image displayed on a display area of the display unit at the first position without turning off the image but changing a position of parts of the image relative to the display area of the display unit, when the display unit displaying the image at the first position is moved to the second position.

* * * * *